United States Patent
Masai et al.

(10) Patent No.: US 10,615,672 B2
(45) Date of Patent: Apr. 7, 2020

(54) DEVICE FOR MANUFACTURING A ROTARY ELECTRIC MACHINE

(71) Applicant: HONDA MOTOR CO., LTD., Tokyo (JP)

(72) Inventors: Kenji Masai, Tochigi-ken (JP); Satoru Uchiumi, Tochigi-ken (JP); Takashi Yoshida, Tochigi-ken (JP); Keitaro Momosaki, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 15/383,055

(22) Filed: Dec. 19, 2016

(65) Prior Publication Data

US 2017/0179798 A1 Jun. 22, 2017

(30) Foreign Application Priority Data

Dec. 22, 2015 (JP) ................................. 2015-249790

(51) Int. Cl.
*H02K 15/08* (2006.01)
*H02K 15/00* (2006.01)
*H02K 15/02* (2006.01)

(52) U.S. Cl.
CPC ......... *H02K 15/08* (2013.01); *H02K 15/0081* (2013.01); *H02K 15/022* (2013.01)

(58) Field of Classification Search
CPC ... H02K 15/0081; H02K 15/022; H02K 15/00
See application file for complete search history.

(56) References Cited

U.S. PATENT DOCUMENTS

| | | | | | |
|---|---|---|---|---|---|
| 3,192,961 | A | * | 7/1965 | Moore | H02K 15/066 140/92.1 |
| 5,412,966 | A | * | 5/1995 | Neese | B21B 37/38 134/113 |
| 6,659,385 | B2 | * | 12/2003 | Akita | H02K 15/095 242/432.6 |
| 2004/0250409 | A1 | * | 12/2004 | Luttrell | H02K 15/065 29/596 |
| 2012/0272512 | A1 | | 11/2012 | Uchiumi et al. | |
| 2014/0259635 | A1 | * | 9/2014 | Taki | H02K 15/0464 29/596 |
| 2015/0020376 | A1 | * | 1/2015 | Brielmaier | H02K 15/095 29/596 |
| 2017/0179798 | A1 | * | 6/2017 | Masai | H02K 15/08 |

FOREIGN PATENT DOCUMENTS

JP 2012-235593 11/2012

\* cited by examiner

*Primary Examiner* — Minh N Trinh
(74) *Attorney, Agent, or Firm* — Rankin, Hill & Clark LLP

(57) ABSTRACT

A manufacturing device that is used in a manufacturing method for a rotary electric machine is equipped with an insertion roller having an outer circumferential surface configured to contact a coil lead line in such a manner that the coil lead line is inserted into accommodating grooves of an insulator, a roller support section that rotatably supports the insertion roller, and a bending unit that performs a bending process to bend the coil lead line by coming into contact with the coil lead line so as to form a terminal part.

6 Claims, 17 Drawing Sheets

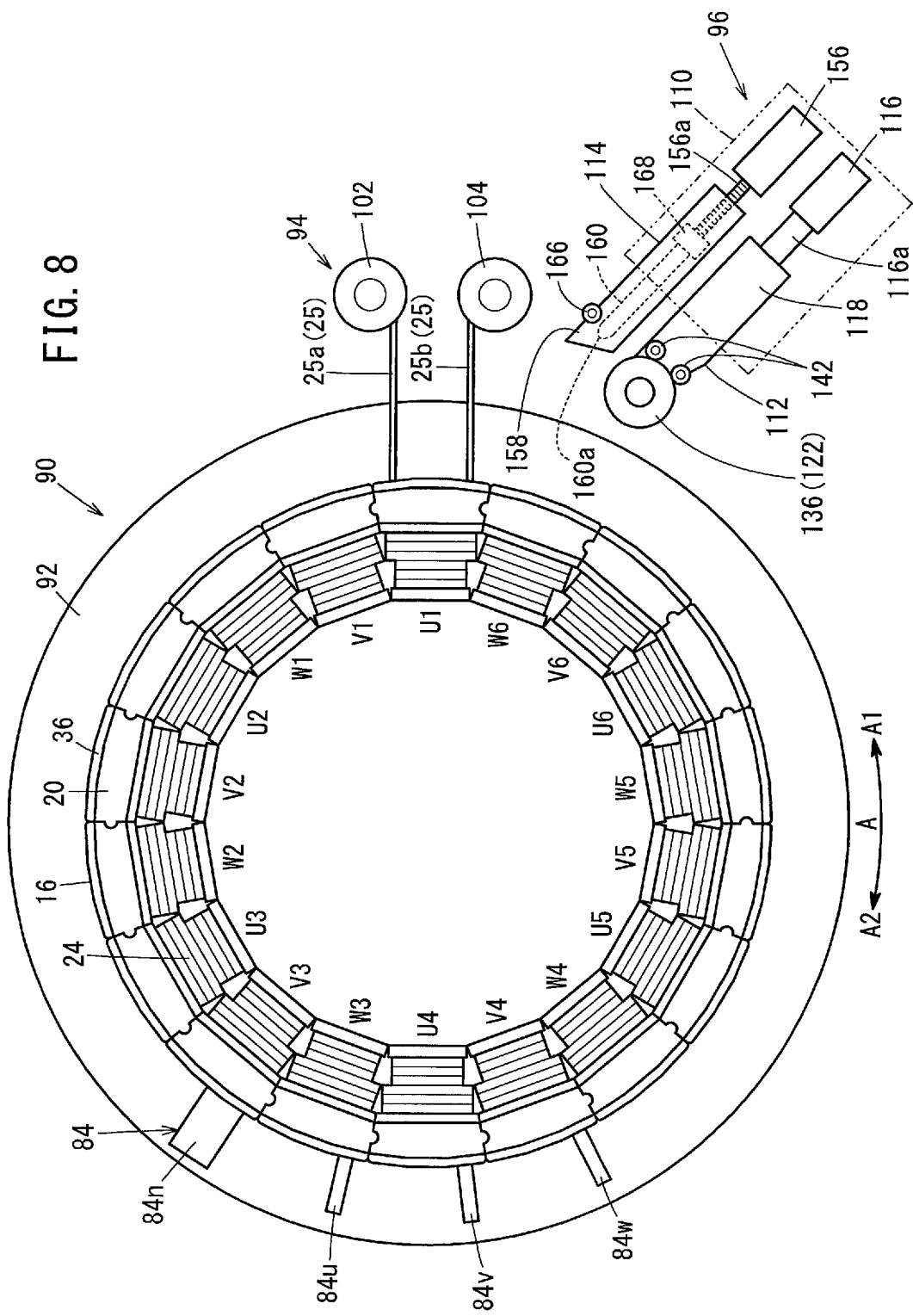

DEVICE FOR MANUFACTURING A ROTARY ELECTRIC MACHINE

CROSS-REFERENCE TO RELATED APPLICATION

This application is based upon and claims the benefit of priority from Japanese Patent Application No. 2015-249790 filed on Dec. 22, 2015, the contents of which are incorporated herein by reference.

BACKGROUND OF THE INVENTION

Field of the Invention

The present invention relates to a manufacturing device for a rotary electric machine and a manufacturing method for a rotary electric machine equipped with a stator having a stator core formed by arranging in an annular shape a plurality of divided cores each having a coil surrounding a portion of a divided iron core through an insulator.

Description of the Related Art

A stator of this type of rotary electric machine includes crossover lines which are formed by routing coil lead lines, which are led out from the coils, within accommodating grooves that are formed along a circumferential direction of the stator core on an outer circumferential surface of an insulator, and terminal parts that are provided on ends of the crossover lines.

A method for manufacturing a rotary electric machine of this type, for example, is disclosed in Japanese Laid-Open Patent Publication No. 2012-235593. In such a method, the crossover lines are formed by placing an outer circumferential surface of a disk portion that is fixed to a main body of a pushing jig in contact with the coil lead line, and inserting the coil lead line into the accommodating grooves, and the terminal parts are formed by pressing the outer circumferential surface of the disk portion against the coil lead line and bending the coil lead line.

SUMMARY OF THE INVENTION

However, with the manufacturing method disclosed in Japanese Laid-Open Patent Publication No. 2012-235593, forming of the crossover lines and forming of the terminal parts are carried out using the same member (disk portion). Therefore, if the curvature of the outer circumferential surface of the disk portion is made comparatively large for reliably forming the terminal parts, then when the crossover lines are formed, the surface of the coil lead line (crossover line) may be damaged by the disk portion. In particular, in the case that the disk portion is fixed with respect to the main body of the pushing jig, a comparatively large sliding friction occurs between the coil lead line and the outer circumferential surface of the disk portion, and therefore, it is likely for the surface of the crossover lines to be damaged.

On the other hand, if the curvature of the outer circumferential surface of the disk portion is made comparatively small in order to suppress damage from occurring to the surface of the crossover lines, the terminal parts cannot be formed (accurately deformed) reliably.

The present invention has been devised taking into consideration the aforementioned problems, and has the object of providing a manufacturing device for a rotary electric machine and a manufacturing method for a rotary electric machine, which are capable of reliably forming terminal parts while damage to the surface of the crossover lines is suppressed.

In order to achieve the above object, according to the present invention, there is provided a manufacturing device for a rotary electric machine. The rotary electric machine is equipped with a stator including a stator core formed by arranging in an annular shape a plurality of divided cores each having a coil surrounding a portion of a divided iron core through an insulator, wherein the stator includes a crossover line which is formed by routing a coil lead line that is led out from the coil within accommodating grooves that are formed with respect to the insulator along a circumferential direction of the stator core, and a terminal part disposed on an end of the crossover line. In addition, the manufacturing device for the rotary electric machine includes an insertion roller, which is disposed movably relative to the divided cores along the circumferential direction of the stator core, and has an outer circumferential surface configured to contact the coil lead line so as to insert the coil lead line into the accommodating grooves, a roller support section configured to rotatably support the insertion roller, and a bending unit configured to perform a bending process to bend the coil lead line by coming into contact with the coil lead line so as to form the terminal part.

In accordance with such a configuration, because the insertion roller for forming the crossover line, and the bending unit for forming the terminal part are provided separately, the terminal part can be formed reliably while damage to the outer surface of the crossover line is suppressed. Further, because the insertion roller is supported rotatably with respect to the roller support section, when the coil lead line is inserted into the accommodating grooves, sliding friction that takes place between the outer circumferential surface of the insertion roller and the coil lead line can be kept relatively small. Consequently, damage to the surface of the crossover line can more reliably be suppressed.

In the above-described manufacturing device, a curved surface having a curvature greater than the curvature of the outer circumferential surface of the insertion roller may be formed on a portion of the bending unit that contacts the coil lead line.

In accordance with such a configuration, since the curvature of the curved surface of the bending unit is greater than the curvature of the outer circumferential surface of the insertion roller, the terminal parts can be formed more reliably while effectively suppressing damage from occurring to the surface of the crossover line.

In the above-described manufacturing device, the bending unit may be capable of being advanced and retracted with respect to the coil lead line.

In accordance with such a configuration, since the bending unit can be retracted with respect to the coil lead line during formation of the crossover line, it is possible to suppress damage from occurring upon the coil lead line abutting against the bending unit. Further, by the bending unit being advanced with respect to the coil lead line when forming the terminal part, the coil lead line can be bent reliably.

In the above-described manufacturing device, the accommodating grooves open in a radially outward direction of the stator core, and the manufacturing device may further include a guide member, which is arranged in proximity to the insertion roller, in a direction in which the coil lead line is routed by the insertion roller, and further, the guide member may support the coil lead line at substantially the same position as the outer circumferential surface of the insertion roller in an axial direction of the stator core.

In accordance with such a configuration, when forming the crossover line, the coil lead line can be prevented from separating away from the outer circumferential surface of the insertion roller.

In the above-described manufacturing device, the guide member may include a pair of restriction walls that face one another mutually along the axial direction of the stator core, a gap in which the coil lead line is capable of being inserted may be formed between the pair of restriction walls, and the bending unit may be disposed in the gap while being capable of being advanced and retracted with respect to a portion of the coil lead line that is positioned in the gap.

In accordance with such a configuration, due to the simple construction thereof, the coil lead line can be supported reliably by the guide member substantially at the same position as the outer circumferential surface of the insertion roller in the axial direction of the stator core.

In the above-described manufacturing device, a guide roller configured to guide the coil lead line into the gap may be provided on the guide member.

In accordance with such a configuration, by the guide roller, the coil lead line can be guided and inserted smoothly into the gap between the pair of restriction walls.

In the above-described manufacturing device, the insertion roller may be adapted to be insertable into the accommodating grooves.

In accordance with such a configuration, by the insertion roller, the coil lead line can be inserted efficiently into the accommodating grooves.

In the above-described manufacturing device, projections that project along the axial direction of the stator core together with extending along the circumferential direction of the stator core may be formed on groove side surfaces of the accommodating grooves, and the roller support section may include a floating member that floatingly supports the insertion roller along an axis of rotation of the insertion roller.

If projections are formed on the groove side surfaces of the accommodating grooves in this manner, when the coil lead line is inserted into the accommodating grooves, the coil lead line is displaced in the axial direction of the stator core depending on locations where the projections are formed and locations where the projections are not formed. However, since the insertion roller is floatingly supported by the floating member, the insertion roller can be made to follow along with the displacement of the coil lead line. Consequently, the coil lead line can be prevented from separating away from the outer circumferential surface of the insertion roller. Further, it is possible to prevent the insertion roller from hitting against the projections of the groove side surfaces of the accommodating grooves.

In the above-described manufacturing device, a backup roller, which rotates in contact with the outer circumferential surface of the insertion roller, is provided in the roller support section.

In accordance with such a configuration, the force that acts on the insertion roller from the coil lead line can be received by the backup roller, and therefore, the insertion roller can smoothly be rotated.

In the above-described manufacturing device, the manufacturing device may further be equipped with a base on which the roller support section is mounted, and concerning the roller support section and the base, an adjustment plate may be interposed between the base and the roller support section, whereby the attachment position of the stator core with respect to the base in the axial direction is capable of being adjusted.

In accordance with such a configuration, the outer circumferential surface of the insertion roller can be positioned highly accurately with respect to the accommodating grooves in the axial direction of the stator core.

In the above-described manufacturing device, the manufacturing device may further be equipped with a position adjusting unit including a position adjusting roller that contacts an extending part of the coil lead line extending from the crossover line, and adjusts the position of the extending part in the circumferential direction of the stator core.

In accordance with such a configuration, the terminal part can be formed with high precision.

In the above-described manufacturing device, the manufacturing device may further be equipped with a cutting device that cuts the extending part of the coil lead line, and the position adjusting unit may be disposed on the cutting device.

In accordance with such a configuration, the manufacturing device for manufacturing the rotary electric machine can be made compact, while enabling the extending part positioned by the position adjusting unit to be easily cut.

A manufacturing method for a rotary electric machine according to the present invention is characterized by a rotary electric machine containing a stator including a stator core formed by arranging in an annular shape a plurality of divided cores each having a coil surrounding a portion of a divided iron core through an insulator, wherein the stator includes a crossover line which is formed by routing a coil lead line that is led out from the coil within accommodating grooves that are formed with respect to the insulator along a circumferential direction of the stator core, and a terminal part disposed on an end of the crossover line. The manufacturing method for the rotary electric machine includes a crossover line forming step of forming the crossover line, by bringing an outer circumferential surface of an insertion roller, which is rotatably supported by a roller support section, into contact with respect to the coil lead line while moving the insertion roller relatively to the divided cores along a circumferential direction of the stator core, and thereby inserting the coil lead line into the accommodating grooves, and a terminal part forming step of, after the crossover line forming step, forming the terminal part by bringing a bending unit into contact with respect to the coil lead line and thereby bending the coil lead line.

In accordance with such a method, the same advantages and effects can be offered as those of the aforementioned manufacturing device for the rotary electric machine. The same applies in relation to the features of the manufacturing method noted below.

In the above-described manufacturing method, on a portion of the bending unit that contacts the coil lead line, a curved surface may be formed having a curvature greater than the curvature of the outer circumferential surface of the insertion roller, that the outer circumferential surface contacting the coil lead line.

In the above-described manufacturing method, in the crossover line forming step, the bending unit may be retracted with respect to the coil lead line, and in the terminal part forming step, the bending unit may be advanced with respect to the coil lead line, thereby bending the coil lead line.

In the above-described manufacturing method, the accommodating grooves may open in a radially outward direction of the stator core, and in the crossover line forming step, the coil lead line may be supported at substantially the same position as the insertion roller in an axial direction of the stator core, by a guide member which is arranged in proximity to the insertion roller in a direction in which the coil lead line is routed by the insertion roller.

In the above-described manufacturing method, the guide member may include a pair of restriction walls that separate from each other and face one another mutually along the axial direction of the stator core, in the crossover line forming step, the coil lead line may be inserted into a gap formed between the pair of restriction walls, and the bending unit that is disposed in the gap may be retracted, and in the terminal part forming step, the bending unit may be advanced with respect to a portion of the coil lead line that is positioned in the gap.

In the above-described manufacturing method, in the crossover line forming step, the coil lead line may be guided into the gap by a guide roller provided on the guide member.

In the above-described manufacturing method, in the crossover line forming step, the insertion roller may be placed in contact with the coil lead line in a state of being inserted into the accommodating grooves.

In the above-described manufacturing method, projections that project along the axial direction of the stator core together with extending along the circumferential direction of the stator core may be formed on groove side surfaces of the accommodating grooves, and in the crossover line forming step, the insertion roller, which is floatingly supported by a floating member of the roller support section along an axis of rotation of the insertion roller, may be placed in contact with the coil lead line.

In the above-described manufacturing method, in the crossover line forming step, the outer circumferential surface of the insertion roller may be placed in contact with the coil lead line, while the insertion roller is supported by a backup roller, which is provided in the roller support section and rotates in contact with the outer circumferential surface of the insertion roller.

In the above-described manufacturing method, a position adjusting step may be performed, in which a position adjusting roller of a position adjusting unit is placed in contact with an extending part of the coil lead line extending from the crossover line, thereby adjusting the position of the extending part in the circumferential direction of the stator core.

According to the present invention, since the crossover line can be formed by the insertion roller, and the terminal part can be formed by the bending unit, the terminal part can be formed reliably while damage to the surface of the crossover line is suppressed.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is a plan view of a divided core and a manufacturing device shown in FIG. 7;

DESCRIPTION OF THE PREFERRED EMBODIMENTS

A preferred embodiment in relation to a manufacturing method for a rotary electric machine, as well as a manufacturing device for the rotary electric machine that implements such a method will be described in detail below with reference to the accompanying drawings.

Figure 1:
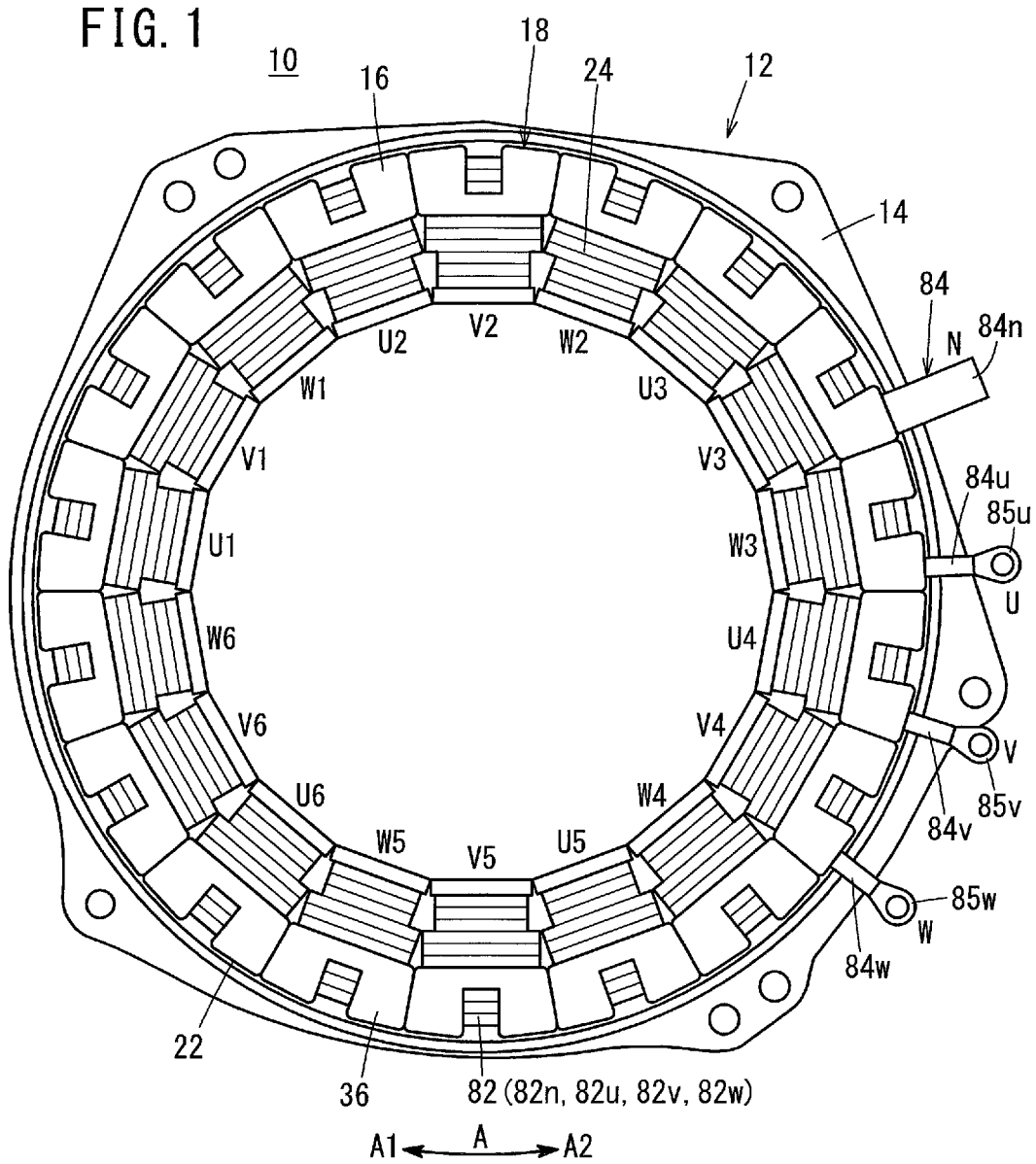
FIG. 1 is a plan view of a rotary electric machine manufactured by a manufacturing device for a rotary electric machine according to an embodiment of the present invention.

First, a description will be given concerning the rotary electric machine 10. As shown in FIG. 1, the rotary electric machine 10, for example, is constituted as an electric motor or a generator comprising a stator 12 and a non-illustrated rotor. The stator 12 is a so-called three-phase Y-connection type of salient pole winding stator, comprising a hollow holder 14, and a stator core 18, which is formed by arranging in an annular shape a plurality (eighteen as shown in FIG. 1) of divided cores 16 along an inner circumferential surface of the holder 14. The aforementioned rotor is disposed in an interior hole of the stator core 18.

In the following description, the circumferential direction of the stator core 18 is defined as an A direction. In particular, a clockwise direction as viewed from the orientation shown in FIG. 1 is defined as an A1 direction, whereas a counterclockwise direction as viewed from the orientation shown in FIG. 1 is defined as an A2 direction. Further, the radial direction of the stator core 18 is defined as a B direction. In particular, a radially inward direction of the stator core 18 is defined as a B1 direction, whereas a radially outward direction of the stator core 18 is defined as a B2 direction. Furthermore, the axial direction of the stator core 18 is defined as a C direction. In particular, the upper direction in FIG. 2 (downward direction of FIG. 7) is defined as a C1 direction, whereas a downward direction in FIG. 2 (upper direction of FIG. 7) is defined as a C2 direction.

It should be noted that the directions given above are merely for the purpose of facilitating description. It is a matter of course that the rotary electric machine 10 and the manufacturing device 90 therefor can be used in any arbitrary orientation (for example, the upward and downward directions may be reversed).

The stator core 18 contains six divided cores 16 having U-phase coils 24, other six divided cores 16 having V-phase coils 24, and still other six divided cores 16 having W-phase coils 24. In this case, in the stator core 18, by arranging a plurality of the divided cores 16 in an annular shape, the coils 24 of the U-phase (U1-phase through U6-phase), the V-phase (V1-phase through V6-phase), and the W-phase (W1-phase through W6-phase) are arranged alongside one another in order of U1, V1, W1, U2, . . . , U6, V6, W6 in the clockwise direction (A1 direction) of FIG. 1. However, the number of divided cores 16 can be set arbitrarily.

Next, a description will be made concerning the configuration of one of the divided cores 16, representatively, from among the respective divided cores 16 including the U1-phase through U6-phase, the V1-phase through V6-phase, and the W1-phase through W6-phase coils 24. The configuration of the divided core 16 described herein is a configuration common to all of the phases of the divided cores 16.

Figure 2:
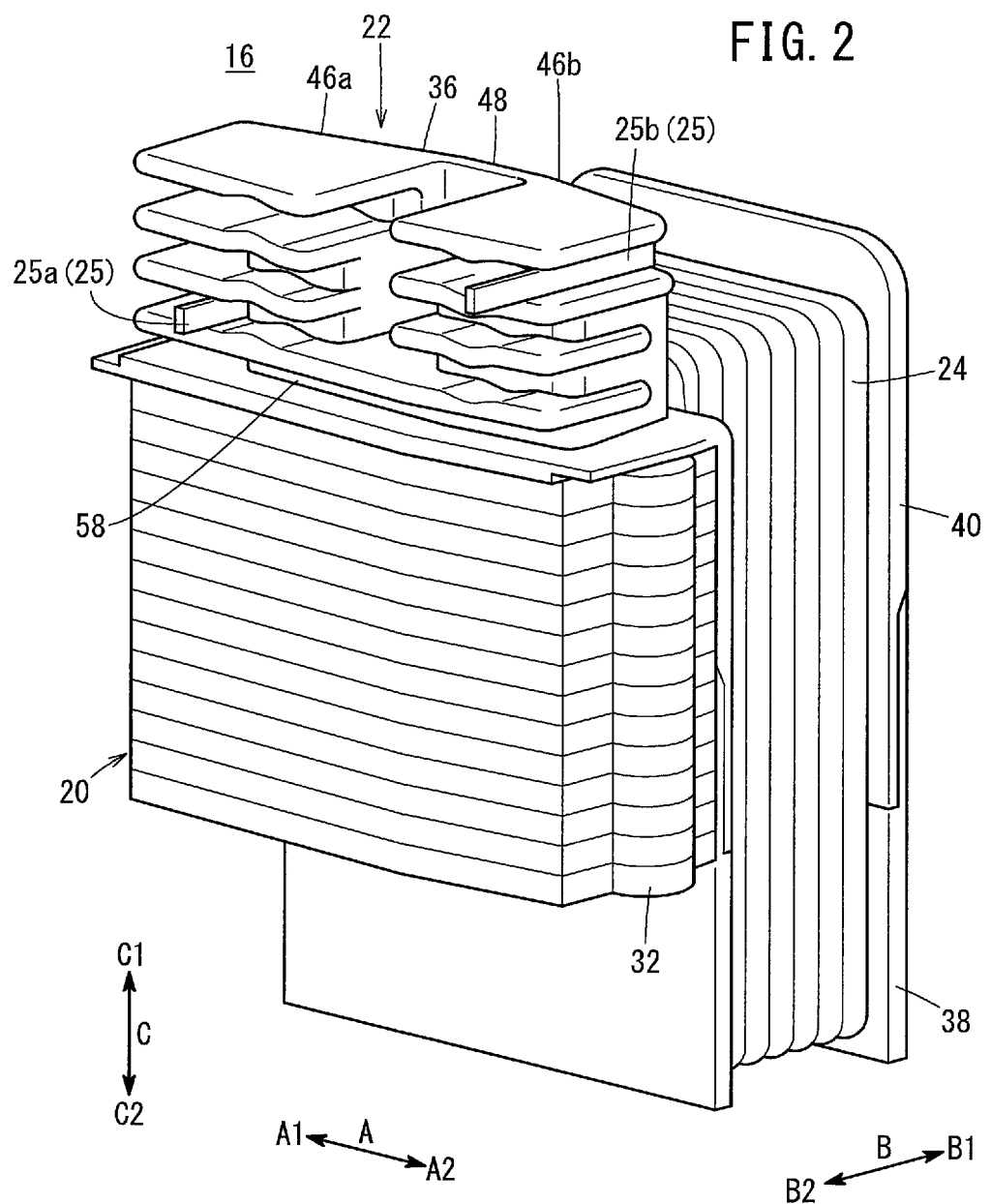
FIG. 2 is a perspective view of a divided core shown in FIG. 1.
Figure 3:
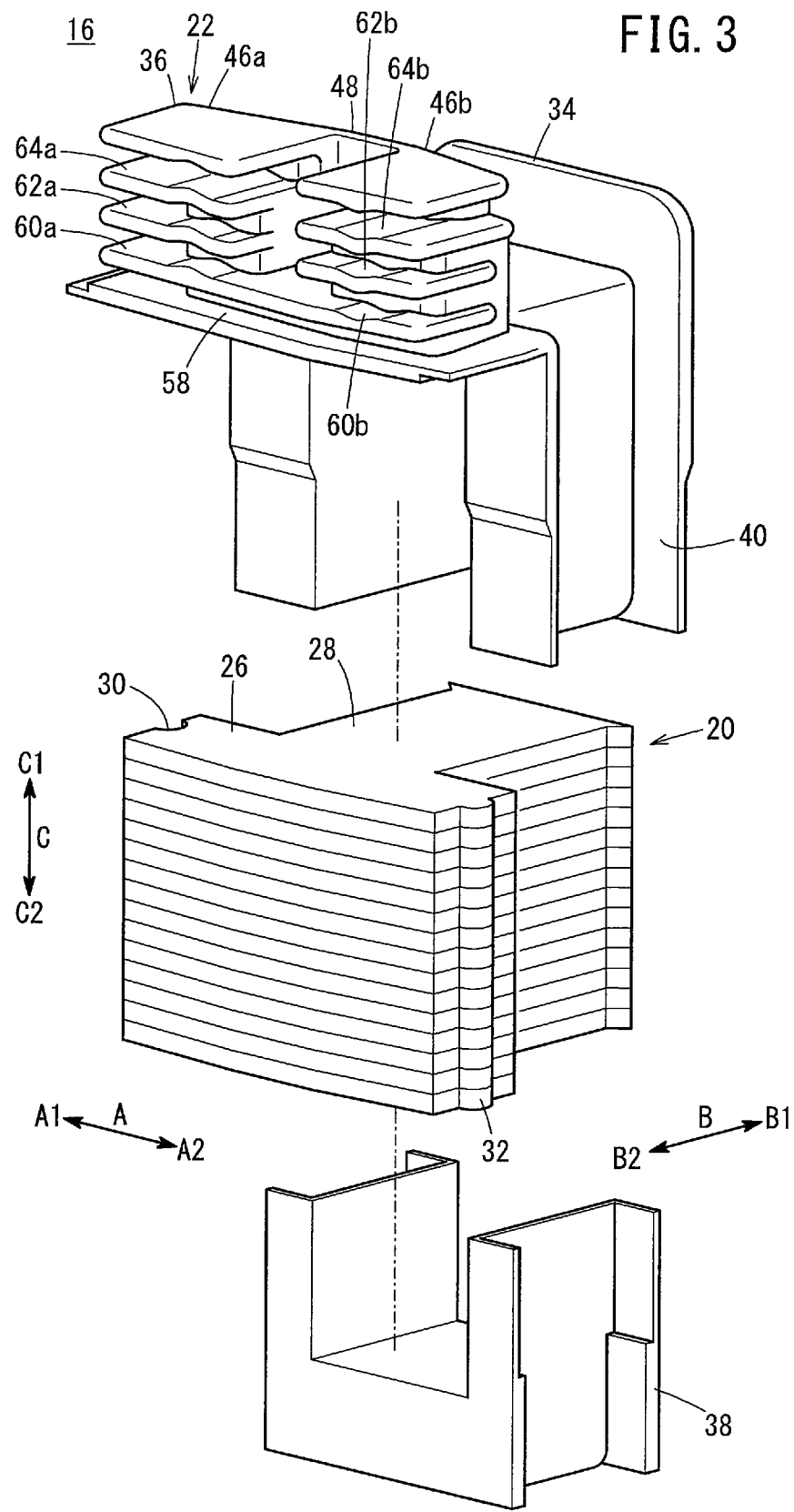
FIG. 3 is an exploded perspective view of the divided core shown in FIG. 2 with omission of a coil thereof.

As shown in FIGS. 2 and 3, the divided core 16 includes a divided iron core 20 constituted by stacking a plurality of substantially T-shaped metal plates (steel plates) formed by stamping out by pressing, an insulator 22 that insulates the divided iron core 20 electrically, and a coil 24 surrounding a portion of the divided iron core 20 through the insulator 22.

The divided iron core 20 also includes a yoke 26 that extends along the A-direction, and a magnetic pole 28 that extends in the B1 direction from a substantially center region of the yoke 26 in the A direction. A substantially semicircular fitting recess 30 is formed in an end of the yoke 26 in the A1 direction, and a substantially semicircular fitting projection 32 capable of being fitted into the fitting recess 30 is formed in an end of the yoke 26 in the A2 direction.

The insulator 22 is flexible and is composed of an insulating material such as a resin. The insulator 22 includes a coil bobbin 34 in which the coil 24 is arranged, and a lead line accommodating section 36 for accommodating therein a first coil lead line 25a on an input side and a second coil lead line 25b on a neutral point side, which are led out from the coil 24. Further, as will be described below, collectively, the first coil lead line 25a and the second coil lead line 25b are referred to as coil lead lines 25. The wires that make up the coil 24 and the coil lead lines 25 are constituted as flat wires having a rectangular shape as viewed in cross-section. However, the cross-sectional shapes of the wires may be formed in a circular shape or a square shape.

The coil bobbin 34 is constituted by fitting together a first bobbin constituent part 38 and a second bobbin constituent part 40 so as to sandwich mutually the magnetic pole 28 from the C directions. The wire is wound around the coil bobbin 34, thereby forming the coil 24.

Figure 4:
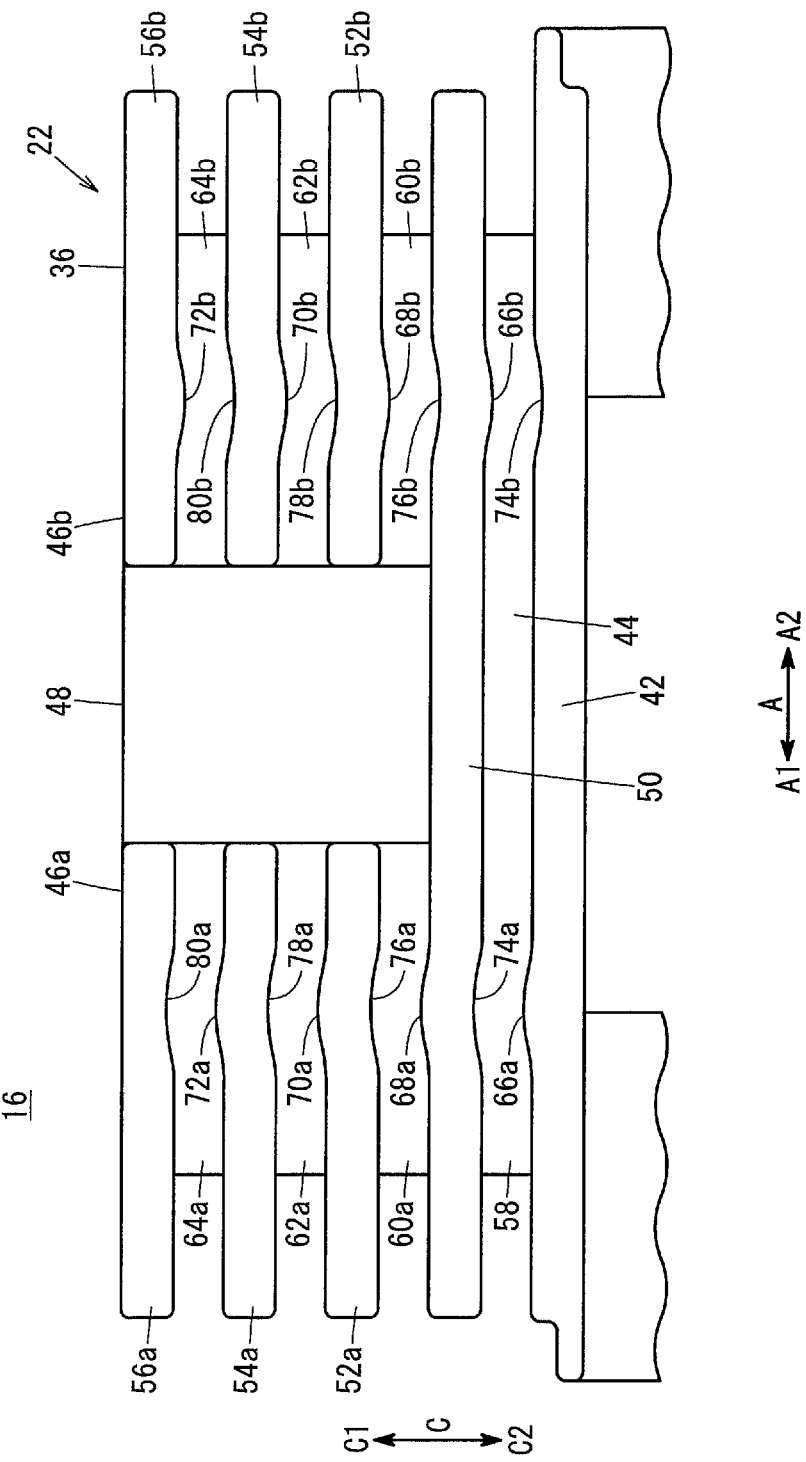
FIG. 4 is a front view of a lead line accommodating section shown in FIG. 3.

As shown in FIGS. 2 through 4, the lead line accommodating section 36 includes a flat plate portion 42 that extends in the B2 direction from an end of the second bobbin constituent part 40 on an opposite side (C1 direction) from the first bobbin constituent part 38 so as to cover the yoke 26, a first wall 44 that projects in the C1 direction from the flat plate portion 42, a block-shaped second wall 46a and a block-shaped third wall 46b that project from the first wall 44 in the C1 direction and are separated mutually in the A direction, and a connecting part 48 that connects the rear surface sides in the B1 direction of the second wall 46a and the third wall 46b.

The lead line accommodating section 36 further includes a first plate 50 that projects in the A direction and the B direction from the first wall 44, three second plates 52a, 54a, 56a that project in the A1 direction and the B2 direction from the second wall 46a, and three third plates 52b, 54b, 56b that project in the A2 direction and the B2 direction from the third wall 46b. The first plate 50, each of the second plates 52a, 54a, 56a, and each of the third plates 52b, 54b, 56b extend in parallel with the flat plate portion 42. The three second plates 52a, 54a, 56a are positioned at equal intervals in the axial direction of the stator core 18, and the three third plates 52b, 54b, 56b are positioned at equal intervals in the axial direction of the stator core 18.

By constituting the lead line accommodating section 36 in the manner described above, seven accommodating grooves 58, 60a, 60b, 62a, 62b, 64a, 64b capable of housing the coil lead lines 25 are formed in the lead line accommodating section 36. More specifically, the accommodating groove 58 is constituted by the flat plate portion 42, the first wall 44, and the first plate 50. The first coil lead line 25a (W-phase first coil lead line 25a) that is led out from the W-phase coil 24 is accommodated in the accommodating groove 58.

The accommodating groove 60a is constituted by the first plate 50, a proximal end of the second wall 46a, and the second plate 52a, and the accommodating groove 60b is constituted by the first plate 50, a proximal end of the third wall 46b, and the third plate 52b. The accommodating groove 60a and the accommodating groove 60b are positioned at substantially the same height. The first coil lead line 25a (V-phase first coil lead line 25a) that is led out from the V-phase coil 24 is accommodated in the accommodating grooves 60a, 60b.

The accommodating groove 62a is constituted by the second plate 52a, an intermediate part of the second wall 46a, and the second plate 54a, and the accommodating groove 62b is constituted by the third plate 52b, an intermediate part of the third wall 46b, and the third plate 54b. The accommodating groove 62a and the accommodating groove 62b are positioned at substantially the same height. The first coil lead line 25a (U-phase first coil lead line 25a) that is led out from the U-phase coil 24 is accommodated in the accommodating grooves 62a, 62b.

The accommodating groove 64a is constituted by the second plate 54a, a distal end of the second wall 46a, and the second plate 56a, and the accommodating groove 64b is constituted by the third plate 54b, a distal end of the third wall 46b, and the third plate 56b. The accommodating groove 64a and the accommodating groove 64b are positioned at substantially the same height. The second coil lead lines 25*b* (neutral lines) that are led out from the respective coils 24 are accommodated in the accommodating grooves 64*a*, 64*b*.

Figure 14A:
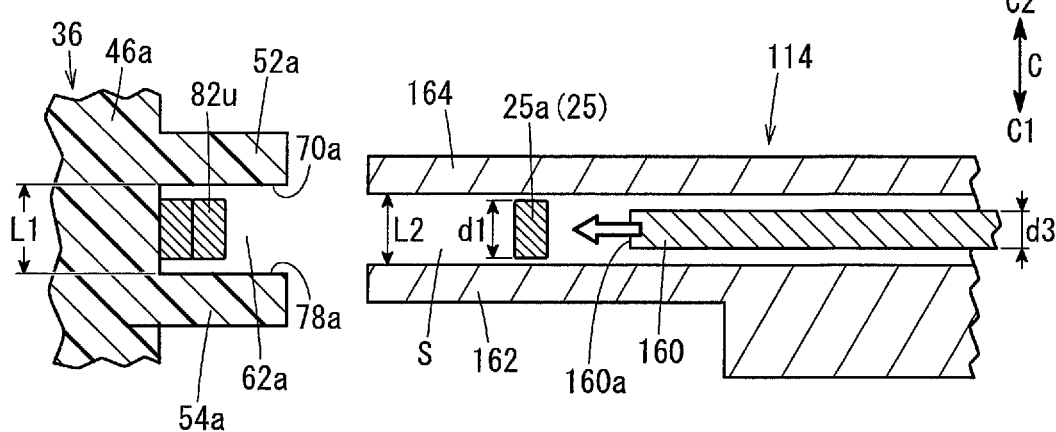
FIG. 14A is a vertical cross-sectional view with partial omission showing a first state of the terminal part forming step.
Figure 14B:
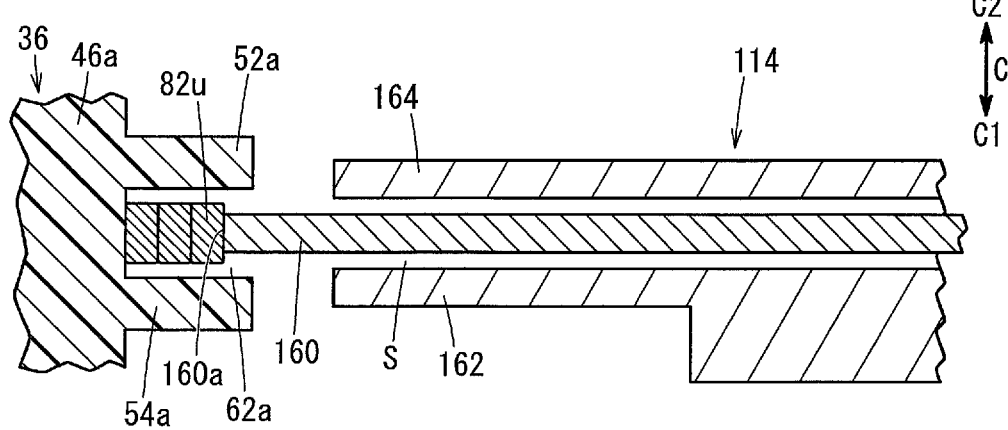
FIG. 14B is a vertical cross-sectional view with partial omission showing a second state of the terminal part forming step.

The accommodating grooves 58, 60*a*, 60*b*, 62*a*, 62*b*, 64*a*, 64*b* extend in the circumferential direction of the stator core 18 and open in a radially outward direction of the stator core 18. Groove widths L1 of the respective accommodating grooves 58, 60*a*, 60*b*, 62*a*, 62*b*, 64*a*, 64*b* are substantially the same, and are formed to be slightly greater than the long sides d1 of the transverse cross section of the coil lead line 25 (see FIG. 14A).

The groove depths of the respective accommodating grooves 64*a*, 64*b* in which the second coil lead lines 25*b* are accommodated are deeper than the groove depths of the respective accommodating grooves 58, 60*a*, 60*b*, 62*a*, 62*b* in which the first coil lead lines 25*a* are accommodated. More specifically, according to the present embodiment, eighteen of the second coil lead lines 25*b* are capable of being held in each of the accommodating grooves 64*a*, 64*b*, whereas three of the first coil lead lines 25*a* are capable of being held in each of the accommodating grooves 58, 60*a*, 60*b*, 62*a*, 62*b*.

Projections 66*a*, 68*a*, 70*a*, 72*a* that project out in the C1 direction are formed respectively on an A1 side of the groove side surface oriented in the C1 direction of the accommodating groove 58, and on groove side surfaces oriented in the C1 direction of the respective accommodating grooves 60*a*, 62*a*, 64*a*. Recesses 74*a*, 76*a*, 78*a*, 80*a* that are recessed in the C1 direction so as to be opposed to the projections 66*a*, 68*a*, 70*a*, 72*a* are formed respectively on an A1 side of the groove side surface oriented in the C2 direction of the accommodating groove 58, and on groove side surfaces oriented in the C2 direction of the respective accommodating grooves 60*a*, 62*a*, 64*a*.

Projections 66*b*, 68*b*, 70*b*, 72*b* that project out in the C2 direction are formed respectively on an A2 side of the groove side surface oriented in the C2 direction of the accommodating groove 58, and on groove side surfaces oriented in the C2 direction of the respective accommodating grooves 60*b*, 62*b*, 64*b*. Recesses 74*b*, 76*b*, 78*b*, 80*b* that are recessed in the C2 direction so as to be opposed to the projections 66*b*, 68*b*, 70*b*, 72*b* are formed on an A2 side of the groove side surface oriented in the C1 direction of the accommodating groove 58, and on groove side surfaces oriented in the C1 direction of the respective accommodating grooves 60*b*, 62*b*, 64*b*.

The projection 66*a* and the recess 74*a* extend along the circumferential direction of the stator core 18, together with extending across the entire length in the depth direction of the accommodating groove 58 (radial direction of the stator core 18) (see FIG. 3). The outer shapes of the transverse cross sections of the projection 66*a* and the recess 74*a* are formed in arcuate shapes. The amount at which the projection 66*a* projects and the recessed amount of the recess 74*a* are substantially the same. The projections 66*b*, 68*a*, 68*b*, 70*a*, 70*b*, 72*a*, 72*b* are constituted in the same manner as the above-described projection 66*a*, and the recesses 74*b*, 76*a*, 76*b*, 78*a*, 78*b*, 80*a*, 80*b* are constituted in the same manner as the above-described recess 74*a*.

The stator 12, which is equipped with the divided cores 16 constituted as described above, includes crossover lines 82*u* formed by accommodating the U-phase first coil lead lines 25*a* inside the accommodating grooves 62*a*, 62*b*, crossover lines 82*v* formed by accommodating the V-phase first coil lead lines 25*a* inside the accommodating grooves 60*a*, 60*b*, crossover lines 82*w* formed by accommodating the W-phase first coil lead lines 25*a* inside the accommodating groove 58, crossover lines 82*n* formed by accommodating the second coil lead lines 25*b* inside the accommodating grooves 64*a*, 64*b*, three input terminals U, V, W, and one neutral terminal N (see FIG. 1).

The input terminal U is connected through the crossover lines 82*u* to the respective U-phase coils 24, and is formed by bundling together six terminal parts 84*u*, which are provided respectively on the crossover lines 82*u*, as one, and joining a crimp terminal 85*u* to the bundle.

The input terminal V is connected through the crossover lines 82*v* to the respective V-phase coils 24, and is formed by bundling together six terminal parts 84*v*, which are provided respectively on the crossover lines 82*v*, as one, and joining a crimp terminal 85*v* to the bundle.

The input terminal W is connected through the crossover lines 82*w* to the respective W-phase coils 24, and is formed by bundling together six terminal parts 84*w*, which are provided respectively on the crossover lines 82*w*, as one, and joining a crimp terminal 85*w* to the bundle.

The neutral terminal N is connected through the crossover lines 82*n* to all of the coils 24, and is formed by bundling together eighteen terminal parts 84*n*, which are provided respectively on the crossover lines 82*n*, as one, and joining mutually together.

In the following description, the crossover lines 82*u*, 82*v*, 82*w*, 82*n* will be referred to collectively as crossover lines 82, and the terminal parts 84*u*, 84*v*, 84*w*, 84*n* will be referred to collectively as terminal parts 84.

Next, a description will be given concerning the manufacturing device 90 for manufacturing the rotary electric machine 10 that is constituted in the manner described above. As shown in FIGS. 7, 8, 15A, and 15B, the manufacturing device 90 comprises a core arranging section 92, in which the plurality of divided cores 16 can be arranged in an annular shape, a lead line supporting member 94 that supports the coil lead lines 25 of the divided cores 16 that are arranged in the core arranging section 92, a machining device 96, a cutting device 98, and a position adjusting unit 100.

Figure 7:
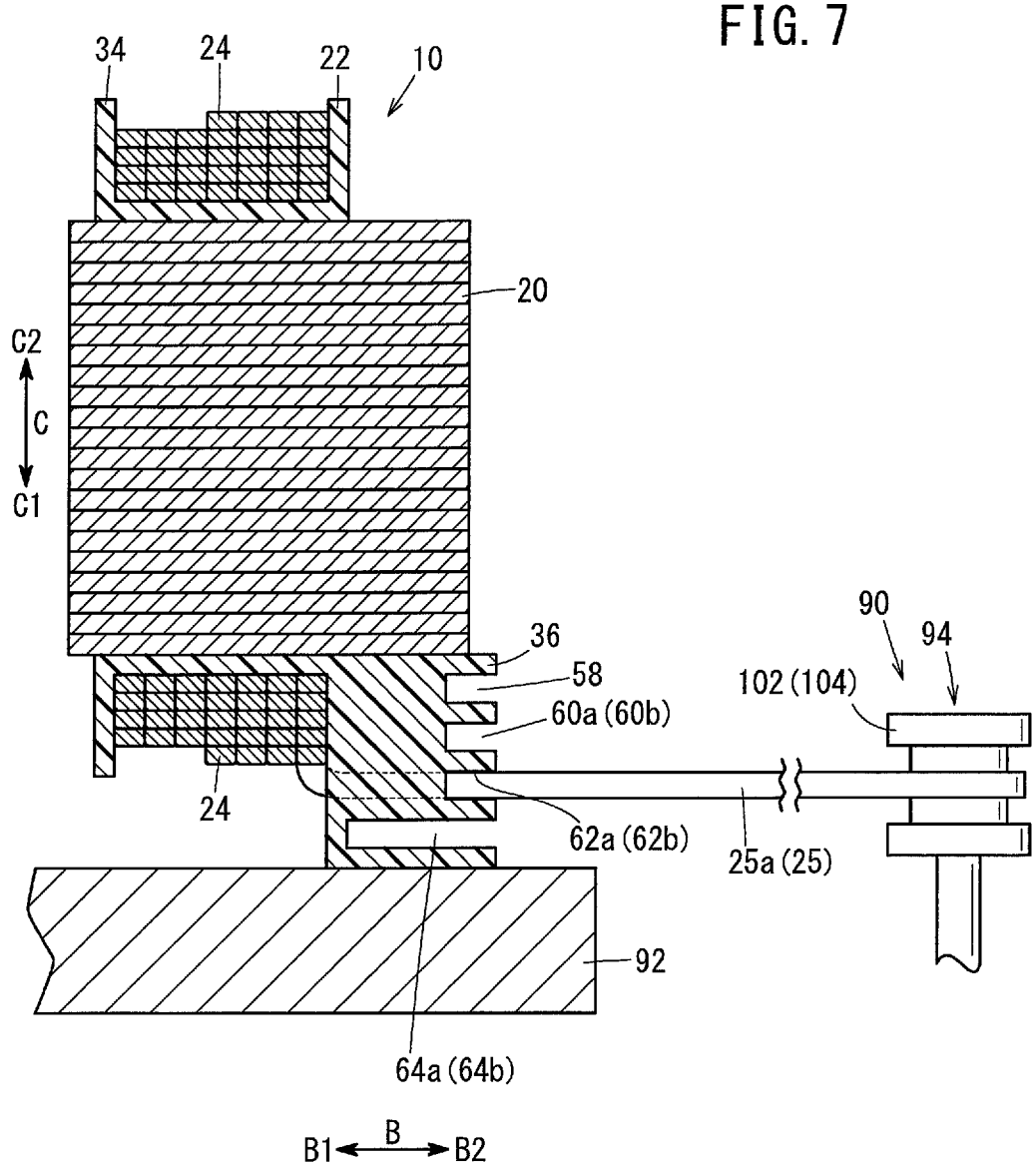
FIG. 7 is a vertical cross-sectional view with partial omission showing an example of a divided core arranging step.

As shown in FIGS. 7 and 8, the core arranging section 92 is configured to be capable of being rotated about the axis of the stator core 18 (in the A directions), and is capable of fixing (retaining) the respective divided cores 16. According to the present embodiment, the respective divided cores 16 are disposed in the core arranging section 92 such that the lead line accommodating sections 36 are positioned downwardly of the divided iron cores 20. However, the respective divided cores 16 may be disposed in an upside down inverted state in the core arranging section 92.

The lead line supporting member 94 includes a first pulley 102 around which the first coil lead lines 25*a* of the divided cores 16 arranged in the core arranging section 92 are wound, and a second pulley 104 around which the second coil lead lines 25*b* of the divided cores 16 are wound. Each of the first pulley 102 and the second pulley 104 is adapted to be capable of being raised and lowered in the C direction.

The machining device 96 includes a support mechanism 110 arranged on an outer circumferential side of the divided cores 16 movably along the A direction with respect to the divided cores 16 that are arranged in the core arranging section 92, and a first machining unit 112 and a second machining unit 114 which are disposed on the support mechanism 110. On the support mechanism 110, the first machining unit 112 and the second machining unit 114 are supported while capable of being raised and lowered along the C direction.

Figure 9A:
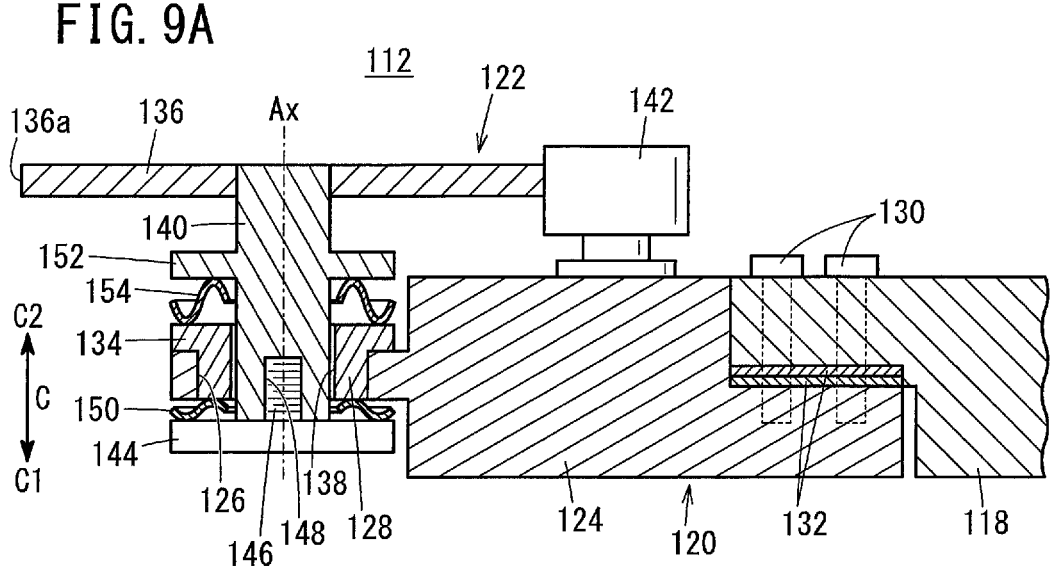
FIG. 9A is a vertical cross-sectional view with partial omission of a first machining section of FIG. 8.

As shown in FIGS. 8 and 9A, the first machining unit 112 is a device for the purpose of forming the crossover lines 82, and comprises a first drive source 116 fixed to the support mechanism 110, a base member 118 extending in a direction and which is displaced (advanced and retracted) under the action of the first drive source 116, a roller support section 120 attached to the base member 118, and an insertion roller 122 supported rotatably on the roller support section 120.

The first machining unit 112 is arranged such that the axis of rotation Ax of the insertion roller 122 is substantially in parallel with the axial direction (C direction) of the stator core 18. The first machining unit 112 is capable of being used in any arbitrary orientation (for example, in an upside down inverted manner). Further, in the structure of the first machining unit 112, the first drive source 116 side thereof is referred to as a proximal end side, and the insertion roller 122 side thereof is referred to as a distal end side.

According to the present embodiment, the first drive source 116 is constituted as a cylinder. However, the first drive source 116 may be a motor or the like. The base member 118 is disposed so as to be capable of sliding with respect to the support mechanism 110 along the direction in which the base member 118 extends. The proximal end side of the base member 118 is fixed to a rod (output shaft) 116a of the first drive source 116, and the distal end of the base member 118 is thinner than the proximal end side thereof.

The roller support section 120 includes a support section main body 124 attached to the base member 118, and a cylindrical bush 128 that is fitted into a through hole 126 formed in the distal end of the support section main body 124. The support section main body 124 extends along the direction in which the base member 118 extends. A proximal end of the support section main body 124 is formed to be thinner than an intermediate portion of the support section main body 124, and in a state of being overlapped with the distal end of the base member 118, the support section main body 124 is fixed with respect to the base member 118 by a plurality of screw members 130.

Adjustment plates (adjustment shims) 132 can be interposed between the distal end of the base member 118 and the proximal end of the support section main body 124, in order to adjust the mounting position of the support section main body 124 with respect to the base member 118 in the thickness direction (C direction) of the base member 118. It goes without saying that the number and thicknesses of the adjustment plates 132 can be set arbitrarily. An annular flange 134 that prevents the bush 128 from being pulled out from the through hole 126 is formed on an upper end (an end in the C2 direction) of the bush 128.

The insertion roller 122 includes a disk-shaped roller main body 136 having an outer circumferential surface 136a that contacts the coil lead lines 25 so as to insert the coil lead lines 25 into the accommodating grooves 58, 60a, 60b, 62a, 62b, 64a, 64b, and a roller shaft 140 provided in a center part of the roller main body 136 and inserted rotatably into an inner hole 138 of the bush 128.

Figure 12A:
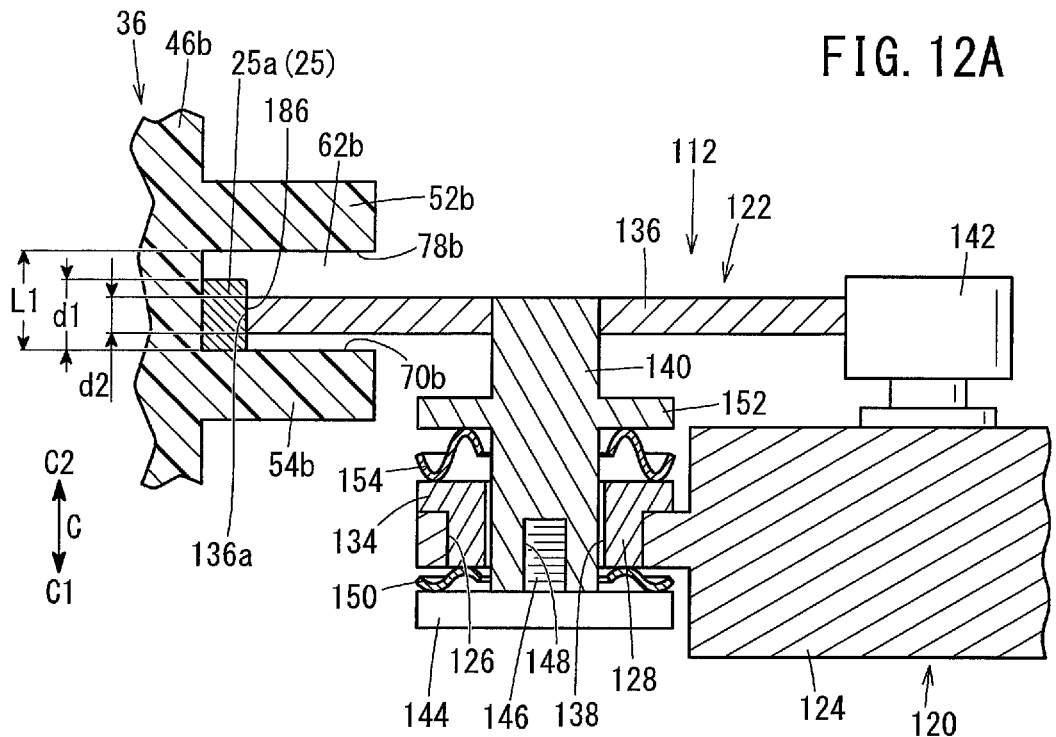
FIG. 12A is a vertical cross-sectional view taken along line XIIA-XIIA of FIG. 11.

The thickness d2 of the roller main body 136 is formed to be smaller than the groove width L1 of the respective accommodating grooves 58, 60a, 60b, 62a, 62b, 64a, 64b (see FIG. 12A). More specifically, the roller main body 136 is capable of being inserted into the accommodating grooves 58, 60a, 60b, 62a, 62b, 64a, 64b. In accordance with this feature, the coil lead lines 25 can be inserted efficiently into the interiors of the accommodating grooves 58, 60a, 60b, 62a, 62b, 64a, 64b by the insertion roller 122.

The outer circumferential surface 136a of the roller main body 136 is in contact with outer circumferential surfaces of a plurality of backup rollers 142 (two are shown in the example of FIG. 8) that are provided rotatably on the roller support section 120. More specifically, the respective backup rollers 142 rotate accompanying the rotation of the insertion roller 122 (roller main body 136).

Consequently, while the insertion roller 122 is rotated efficiently, a load that acts on the roller main body 136 from the coil lead lines 25 can be received and borne by the backup rollers 142. Thus, frictional wear of the bush 128 by the roller shaft 140 can effectively be reduced, and therefore, the insertion roller 122 can be allowed to rotate smoothly. The number of the backup rollers 142 may be one or may be three or more.

On a lower end surface (an end surface in the C1 direction) of the roller shaft 140, a bolt hole 148 is formed in which a bolt 146 is screw-engaged. The bolt 146 has a head part 144 having an outer diameter which is greater than the inner diameter of the bush 128. Accordingly, the roller shaft 140 can be prevented from being pulled out from the inner hole 138 of the bush 128.

The bolt 146 is tightened in the bolt hole 148 by being rotated in an opposite direction to a direction in which the insertion roller 122 is rotated when the coil lead lines 25 are inserted into the accommodating grooves 58, 60a, 60b, 62a, 62b, 64a, 64b. In accordance with this feature, loosening of the tightened condition of the bolt 146 with respect to the roller shaft 140 when the coil lead lines 25 are inserted into the accommodating grooves 58, 60a, 60b, 62a, 62b, 64a, 64b can be prevented.

A wave washer 150 is interposed between the bush 128 and the head part 144 of the bolt 146. On the roller shaft 140, at a portion thereof located more upwardly (in the direction of the arrow C2) than the bush 128, a projection 152 is formed that extends around the total circumference of the roller shaft 140 and projects radially outwardly from the roller shaft 140. Another wave washer 154 is interposed between the projection 152 and the flange 134 of the bush 128.

The wave washers 150, 154 function as floating members that floatingly support the insertion roller 122 in the vertical direction (C direction). Such floating members are not limited to wave washers 150, 154, and may be elastic members such as coil springs or rubber, etc.

Figure 9B:
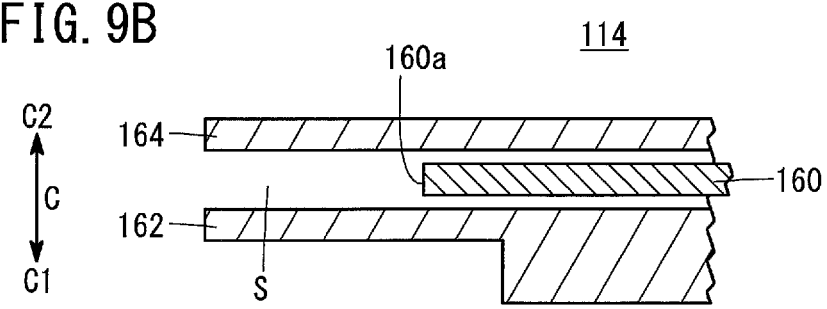
FIG. 9B is a vertical cross-sectional view with partial omission of a second machining section of FIG. 8.

As shown in FIGS. 8 and 9B, the second machining unit 114 is a device for forming the terminal parts 84, and is arranged in close proximity with respect to the first machining unit 112 in the direction in which the coil lead lines 25 are routed (the A1 direction in the example of FIG. 8) by the first machining unit 112. The second machining unit 114 comprises a second drive source 156 and a guide member 158 fixed to the support mechanism 110, and a bending unit 160 that is advanced and retracted under the action of the second drive source 156.

According to the present embodiment, the second drive source 156 is constituted as a servomotor. However, instead of a servomotor, the second drive source 156 may be a motor, a cylinder, or the like. Male screw threads are formed on an output shaft 156a of the second drive source 156.

The guide member 158 serves to support the coil lead lines 25 at substantially the same position in the C direction as the outer circumferential surface 136a of the roller main body 136, and is arranged in close proximity in the A direction with respect to the roller main body 136. The guide member 158 includes a pair of plate-shaped restriction walls 162, 164 mutually opposed to one another in the C direction. The respective restriction walls 162, 164 are connected mutually by a non-illustrated fixing tool so as to extend in one direction (i.e., along the direction in which the base member 118 of the first machining unit 112 extends).

A gap S in which the coil lead lines 25 can be inserted is formed between the pair of restriction walls 162, 164. More specifically, an interval L2 of the gap S in the C direction is greater than the long sides d1 of the transverse cross section of the coil lead lines 25, and is narrower than the groove width L1 of the accommodating grooves 58, 60*a*, 60*b*, 62*a*, 62*b*, 64*a*, 64*b* (see FIG. 14A). Further, the pair of restriction walls 162, 164 are arranged such that the gap S is located in the C direction substantially at the same position as the roller main body 136. In the guide member 158, a guide roller 166 is disposed rotatably for guiding the coil lead lines 25 into the gap S. Consequently, the coil lead lines 25 can be introduced smoothly into the gap S of the pair of restriction walls 162, 164.

The bending unit 160 is a plate shaped member that extends along the direction in which the respective restriction walls 162, 164 extend, and is arranged within the gap S of the pair of restriction walls 162, 164 so as to be capable of moving along the direction in which the bending unit 160 extends. Stated otherwise, the thickness d3 of the bending unit 160 is thinner than the groove width L1 of the accommodating grooves 58, 60*a*, 60*b*, 62*a*, 62*b*, 64*a*, 64*b*. The bending unit 160 includes a nut 168 in which female screw threads are formed, the female screw threads being screw-engaged with the male screw threads of the output shaft 156*a* of the second drive source 156. Owing to this feature, the bending unit 160 is capable of being advanced and retracted with respect to the guide member 158 along the direction of extension thereof under the action of the second drive source 156.

A curved surface 160*a* having a curvature greater than the curvature of the outer circumferential surface 136*a* of the roller main body 136 is formed on a distal end part (an end on an opposite side from the position where the second drive source 156 is positioned) of the bending unit 160 that is placed in contact with the coil lead lines 25.

Figure 15A:
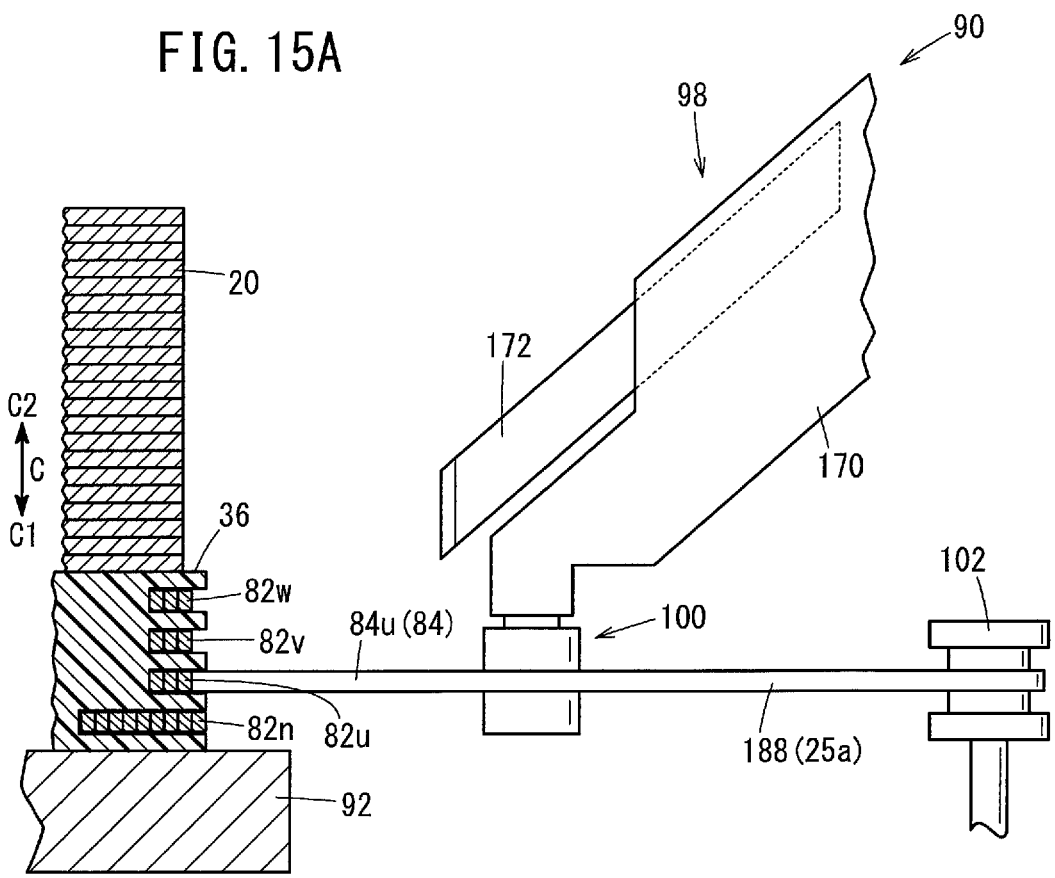
FIG. 15A is a cross-sectional side view with partial omission of FIG. 13B.

As shown in FIG. 15A, the cutting device 98 includes a cutting device main body 170, which is capable of moving with respect to the divided cores 16 that are arranged in the core arranging section 92, and a cutter 172, which is slidably disposed with respect to the cutting device main body 170 and serves to cut the coil lead lines 25.

Figure 15B:
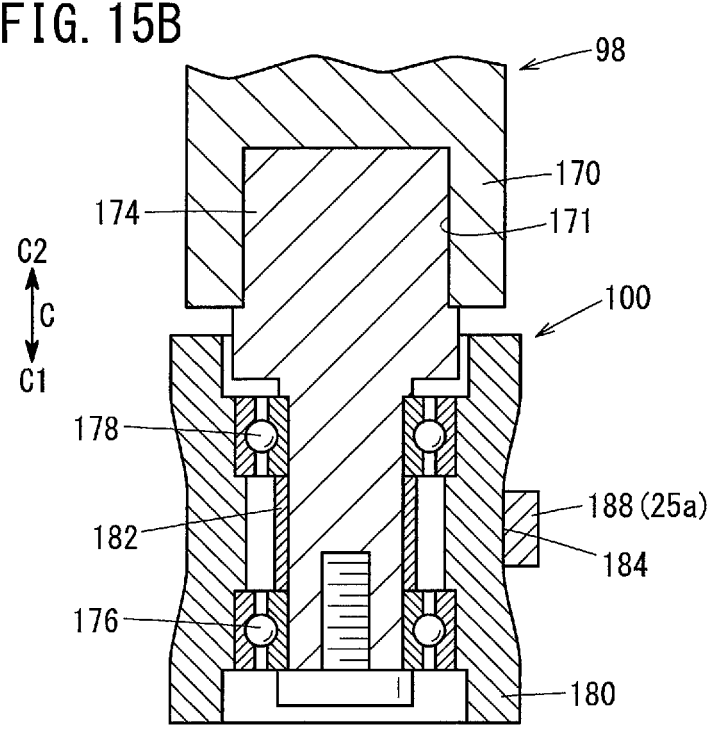
FIG. 15B is an enlarged vertical cross-sectional view of a position adjusting unit shown in FIG. 15A.

As shown in FIG. 15B, the position adjusting unit 100 includes a fixing shaft 174 that is fitted into a hole 171 formed in a lower surface of the cutting device main body 170, and a position adjusting roller 180 disposed rotatably through two bearings 176, 178 with respect to a portion of the fixing shaft 174 that protrudes downwardly beyond the lower surface of the cutting device main body 170.

The respective bearings 176, 178 are constituted in the form of roller bearings. However, the respective bearings 176, 178 may be constituted in the form of other bearings such as slide bearings or the like. The two bearings 176, 178 are separated mutually in the axial direction (C direction) of the fixing shaft 174. A collar member 182 for maintaining a fixed interval between the bearings 176, 178 is arranged between the inner rings of the respective bearings 176, 178.

The position adjusting roller 180 is formed in a cylindrical shape, and an inner circumferential surface thereof is fixedly attached to outer circumferential surfaces of the outer rings of the respective bearings 176, 178. In a central part in the C direction on the outer circumferential surface of the position adjusting roller 180, a supporting recess 184 is formed, which is recessed in an arcuate shape inwardly with respect to both end portions of the outer circumferential surface in the C direction. The coil lead lines 25 are placed in contact with the supporting recess 184.

The manufacturing device 90 for manufacturing the rotary electric machine 10 according to the present embodiment is constructed in the manner described above. Next, a method for manufacturing the rotary electric machine 10 using the manufacturing device 90 will be described.

Figure 5:
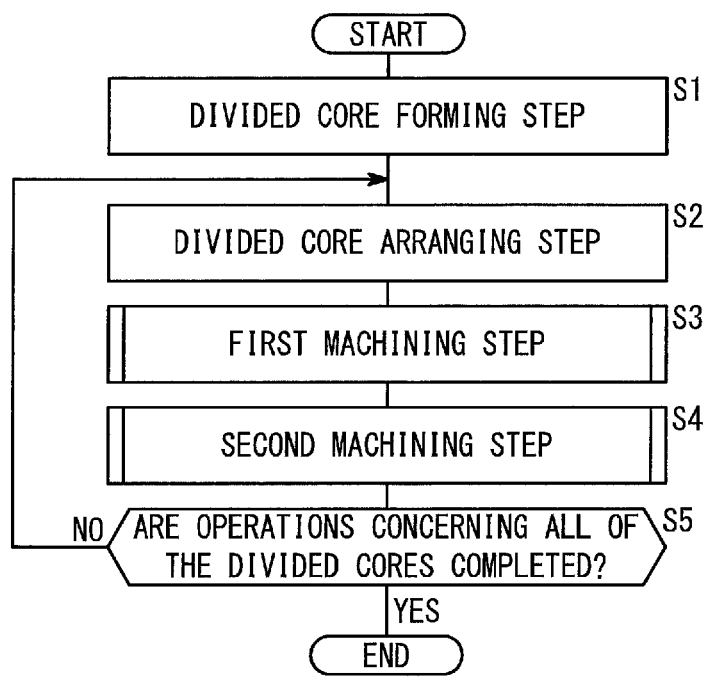
FIG. 5 is a flowchart for describing a manufacturing method for a rotary electric machine according to an embodiment of the present invention.

First, in a divided core forming step, all of the (eighteen individual) divided cores 16 that make up the stator core 18 are formed (step S1 of FIG. 5). More specifically, each of the divided cores 16 is formed by fitting the first bobbin constituent part 38 into the second bobbin constituent part 40 so as to sandwich the divided iron core 20 therebetween and then forming the coil 24 thereon by winding a wire around the coil bobbin 34.

Next, a divided core arranging step, a first machining step, and a second machining step are carried out on each of the divided cores 16 that were formed by the divided core forming step (step S2 through step S4). In addition, in the case that the operations (step S2 through step S4) concerning all of the divided cores 16 have not been completed (step S5: NO), then the processes of step S2 and thereafter are performed in relation to the divided cores 16 for which such operations have not been completed.

Hereinbelow, an example will be described of performing steps S2 through S4 in relation to a lastly arranged (eighteenth) divided core 16 (U1-phase divided core 16) having a U1-phase coil 24 thereon. More specifically, concerning the other seventeen divided cores 16, the processes of steps S2 through S4 have already been carried out thereon.

As shown in FIG. 7, in the divided core arranging step (step S2), the U1-phase divided core 16 is arranged and fixed at a predetermined location of the core arranging section 92, so that the lead line accommodating section 36 is positioned downwardly of the divided iron core 20. In this case, as shown in FIG. 8, the eighteen divided cores 16 are arranged in an annular shape.

More specifically, the first coil lead lines 25*a* of the U2-phase through U6-phase are inserted into the accommodating grooves 62*a*, 62*b*, are routed to the position of the W3-phase divided core 16, and the crossover lines 82*u* and the terminal part 84*u* are formed. The first coil lead lines 25*a* of the V1-phase through V6-phase are inserted into the accommodating grooves 60*a*, 60*b*, are routed to the position of the U4-phase divided core 16, and the crossover lines 82*v* and the terminal part 84*v* are formed.

The first coil lead lines 25*a* of the W1-phase through W6-phase are inserted into the accommodating groove 58, are routed to the position of the V4-phase divided core 16, and the crossover lines 82*w* and the terminal part 84*w* are formed. The second coil lead lines 25*b* apart from the U1-phase are inserted into the accommodating grooves 64*a*, 64*b*, are routed to the position of the V3-phase divided core 16, and the crossover lines 82*n* and the terminal part 84*n* are formed.

In the divided core arranging step, the first coil lead line 25*a* of the U1 phase is wound around the first pulley 102, and the second coil lead line 25*b* of the U1 phase is wound around the second pulley 104. Consequently, spreading of the first coil lead line 25*a* and the second coil lead line 25*b* in the radially outward direction of the stator core 18 can be suppressed. Stated otherwise, the manufacturing device 90 can be reduced in size. Further, by being raised or lowered in the C direction, the first pulley 102 is positioned substantially at the same position as the accommodating grooves 62*a*, 62*b*, and by being raised or lowered in the C direction, the second pulley 104 is positioned substantially at the same position as the accommodating grooves 64a, 64b.

Figure 6:
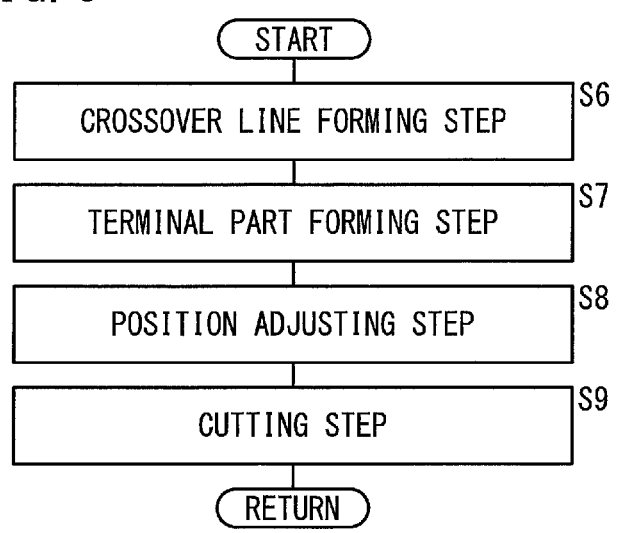
FIG. 6 is a flowchart for describing a first machining step and a second machining step of FIG. 5.

In the first machining step, concerning the U1-phase first coil lead line 25a, the crossover line forming step, the terminal part forming step, the position adjusting step, and the cutting step are carried out sequentially (step S6 through step S9 of FIG. 6).

In the crossover line forming step (step S6), the support mechanism 110 is raised or lowered such that the outer circumferential surface 136a of the roller main body 136 of the first machining unit 112, and the gap S between the pair of restriction walls 162, 164 of the second machining unit 114 are placed at substantially the same position as the accommodating grooves 62a, 62b in the C direction. At this time, by the adjustment plates 132 being interposed between the distal end of the base member 118 and the proximal end of the support section main body 124, the outer circumferential surface 136a of the roller main body 136 is positioned accurately at substantially the same position as the accommodating grooves 62a, 62b in the C direction.

Figure 10A:
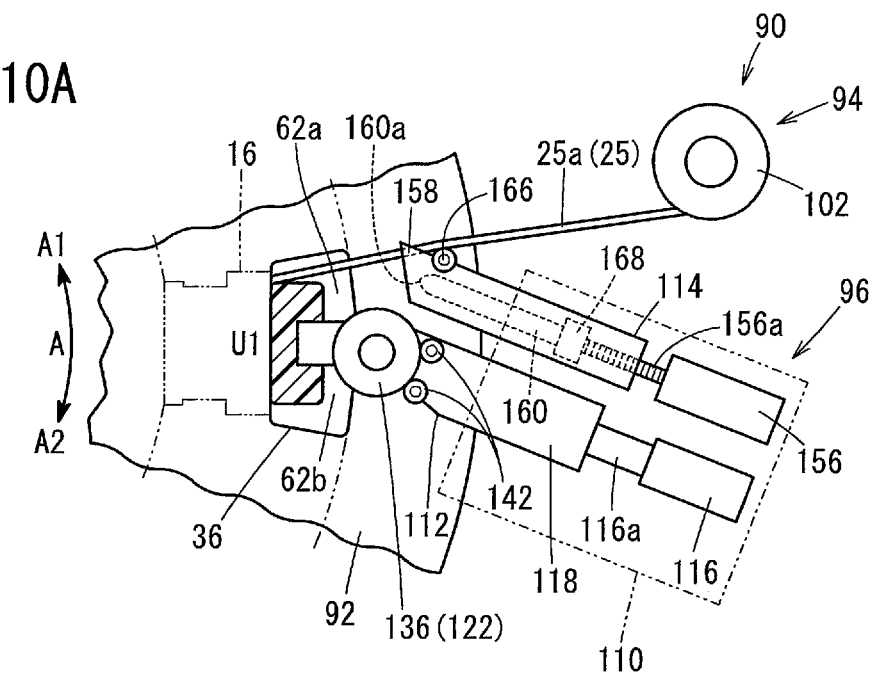
FIG. 10A is a cross-sectional plan view with partial omission for describing a crossover line forming step.

Further, as shown in FIG. 10A, the support mechanism 110 is moved such that the machining device 96 is located at a position in the vicinity of the first coil lead line 25a in the A2 direction. At this time, the direction in which the insertion roller 122 and the bending unit 160 are advanced or retracted intersects with the radial direction (B direction) of the stator core 18.

In addition, the first coil lead line 25a is inserted into the gap S between the pair of restriction walls 162, 164, and comes into contact with the outer circumferential surface of the guide roller 166. Moreover, since the bending unit 160 is in a retracted state, the bending unit 160 can be prevented from abutting against and causing damage to the first coil lead line 25a.

Figure 10B:
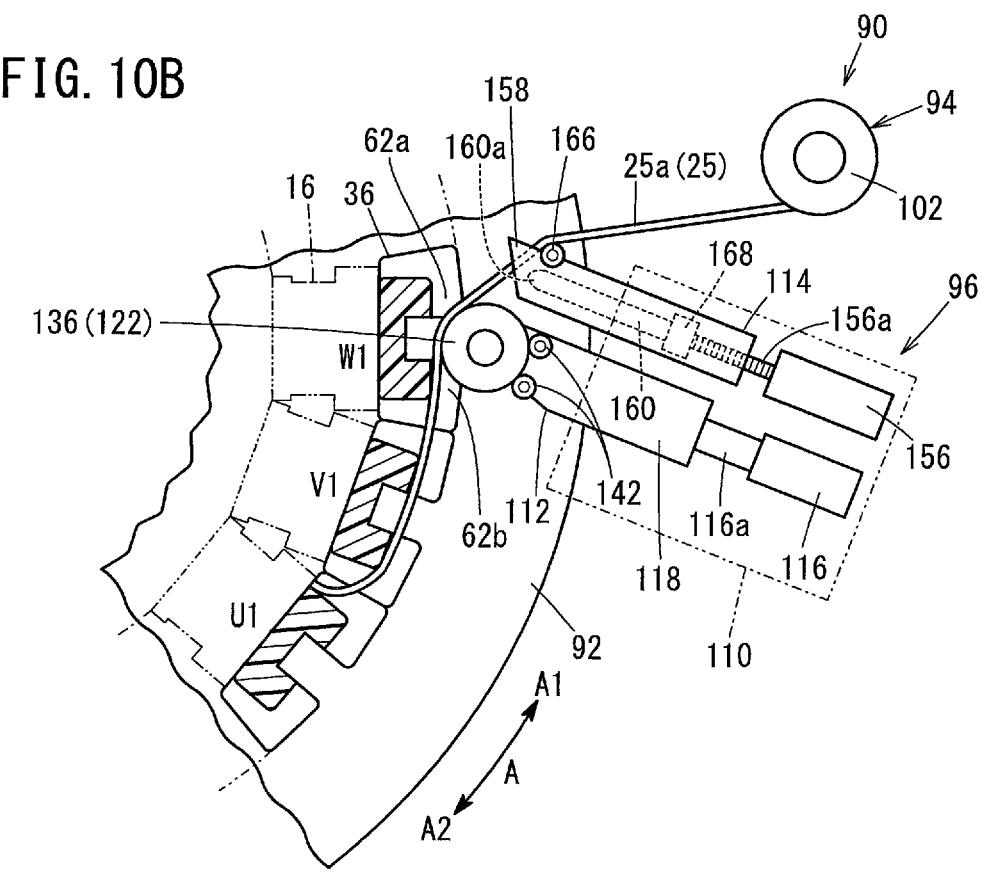
FIG. 10B is a cross-sectional plan view with partial omission showing a state in which a coil lead line shown in FIG. 10A is routed within an accommodating groove.

Next, as shown in FIG. 10B, the core arranging section 92 is rotated in the direction of the arrow A2. At this time, the support mechanism 110 of the machining device 96 also may be moved along the A direction. Upon doing so, the first coil lead line 25a is routed out from the first pulley 102 and is guided by the guide roller 166 into the gap S between the pair of restriction walls 162, 164. Additionally, in a state in which movement thereof in the vertical direction is restricted by the restriction walls 162, 164, the first coil lead line 25a is guided to the outer circumferential surface 136a of the roller main body 136, is placed in contact with the outer circumferential surface 136a of the roller main body 136, and is inserted (pressed) into the interior of the accommodating grooves 62a, 62b. In addition, accompanying rotation of the core arranging section 92 in the A2 direction, the first coil lead line 25a is routed along the A1 direction in the interior of the accommodating grooves 62a, 62b.

At this time, by the outer circumferential surface 136a of the roller main body 136 contacting the surface of the first coil lead line 25a, the insertion roller 122 is rotated with respect to the roller support section 120. Therefore, sliding friction that occurs between the surface of the first coil lead line 25a and the outer circumferential surface 136a of the roller main body 136 can be kept comparatively small.

Further, since loads that act on the roller main body 136 from the first coil lead line 25a are received and borne by the backup rollers 142, friction between the outer circumferential surface of the roller shaft 140 and the inner circumferential surface of the bush 128 can be kept relatively minimal. According to this feature, the insertion roller 122 can be rotated efficiently.

Figure 11:
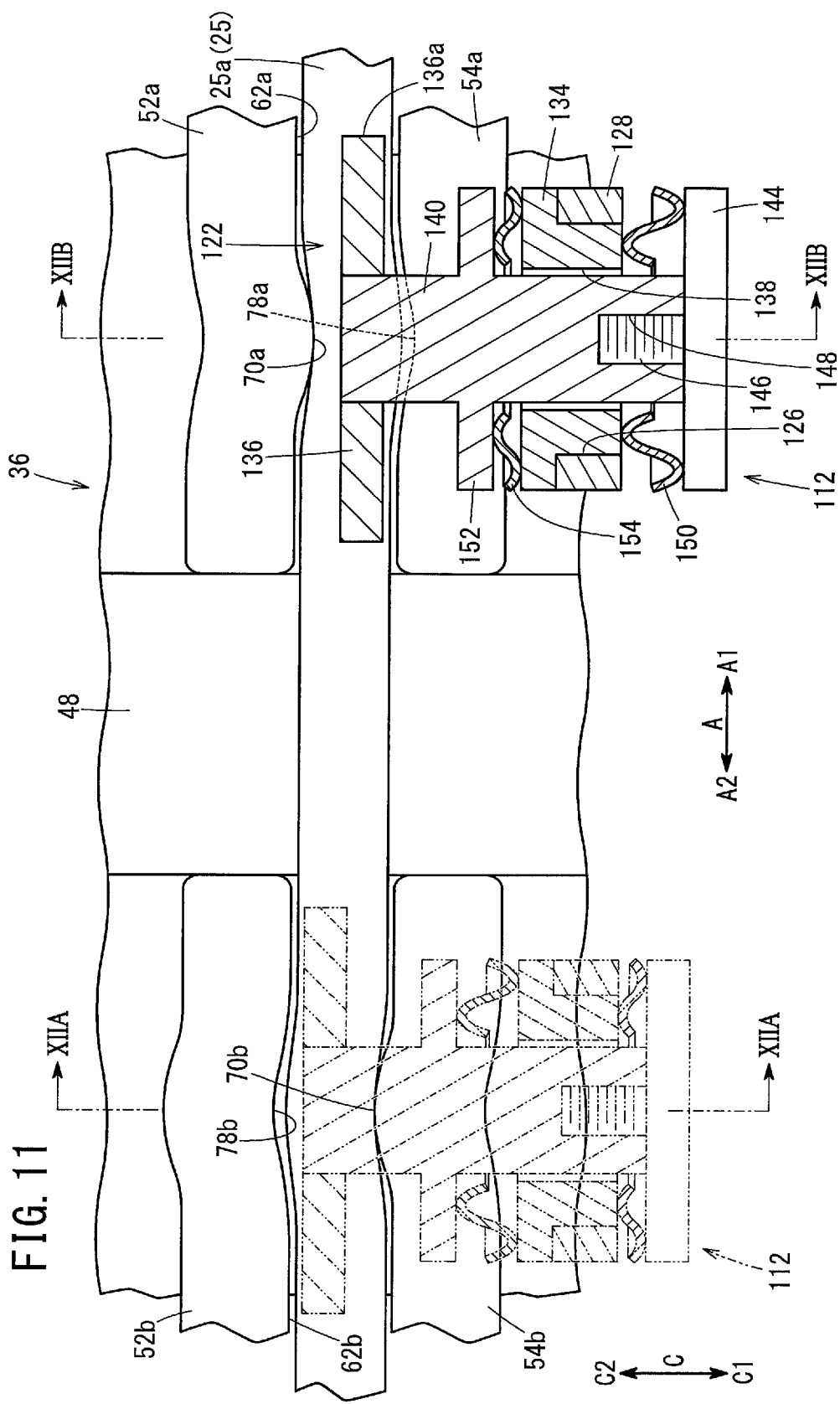
FIG. 11 is a cross-sectional front view with partial omission for describing a crossover line forming step.

As shown in FIGS. 11 and 12A, when the insertion roller 122 is positioned at the projection 70b that is formed on the groove side surface of the accommodating groove 62b, a portion (contact portion 186) of the first coil lead line 25a that is in contact with the insertion roller 122 is pressed upwardly by the projection 70b in the C2 direction. Upon doing so, while the wave washer 150 is compressed and deformed, the insertion roller 122 moves together with the first coil lead line 25a in the C2 direction (in following relation to the first coil lead line 25a). Therefore, hitting of the roller main body 136 against the projection 70b (groove side surface of the accommodating groove 62b) can be suppressed.

When the insertion roller 122 passes the projection 70b, the contact portion 186 of the first coil lead line 25a is moved in the C1 direction, and therefore, while the compressed and deformed wave washer 150 is restored to its original shape, the insertion roller 122 moves together with the first coil lead line 25a (is restored to its original position) in the C1 direction.

In the first coil lead line 25a that is inserted into the accommodating groove 62b, the portion thereof that is in contact with the projection 70b is bent and deformed along the projection 70b in the C2 direction. Consequently, by means of a spring back effect, a counterforce acts on the deformed portion so as to return the deformed portion in the C1 direction, so that the deformed portion can reliably be held on the projection 70b.

Figure 12B:
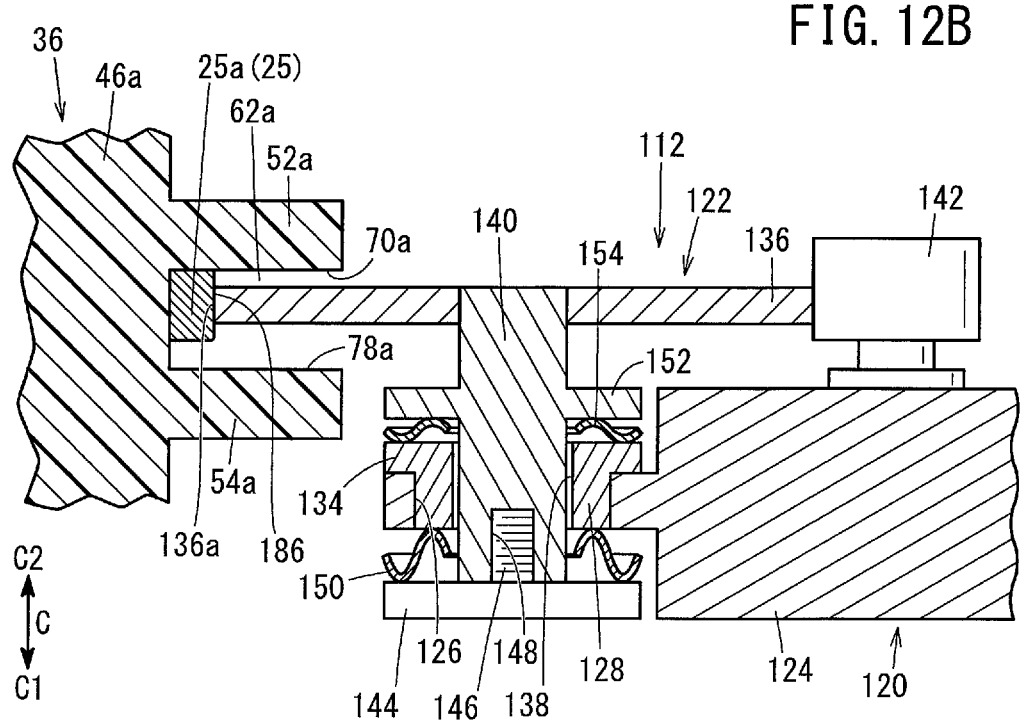
FIG. 12B is a vertical cross-sectional view taken along line XIIB-XIIB of FIG. 11.

On the other hand, as shown in FIGS. 11 and 12B, when the insertion roller 122 is positioned at the projection 70a that is formed on the groove side surface of the accommodating groove 62a, the contact portion 186 of the first coil lead line 25a is pressed downwardly by the projection 70a in the C1 direction. Upon doing so, while the wave washer 154 is compressed and deformed, the insertion roller 122 moves together with the first coil lead line 25a in the C1 direction (in following relation to the first coil lead line 25a). Therefore, hitting of the roller main body 136 against the projection 70a (groove side surface of the accommodating groove 62a) can be suppressed.

When the insertion roller 122 passes the projection 70a, the contact portion 186 of the first coil lead line 25a is moved in the C2 direction, and therefore, while the compressed and deformed wave washer 154 is restored to its original shape, the insertion roller 122 moves together with the first coil lead line 25a (is restored to its original position) in the C2 direction.

In the first coil lead line 25a that is inserted into the accommodating groove 62a, the portion thereof that is in contact with the projection 70a is bent and deformed along the projection 70a in the C1 direction. Consequently, by means of a spring back effect, a counterforce acts on the deformed portion so as to return the deformed portion in the C2 direction, so that the deformed portion can reliably be held on the projection 70a.

Figure 13A:
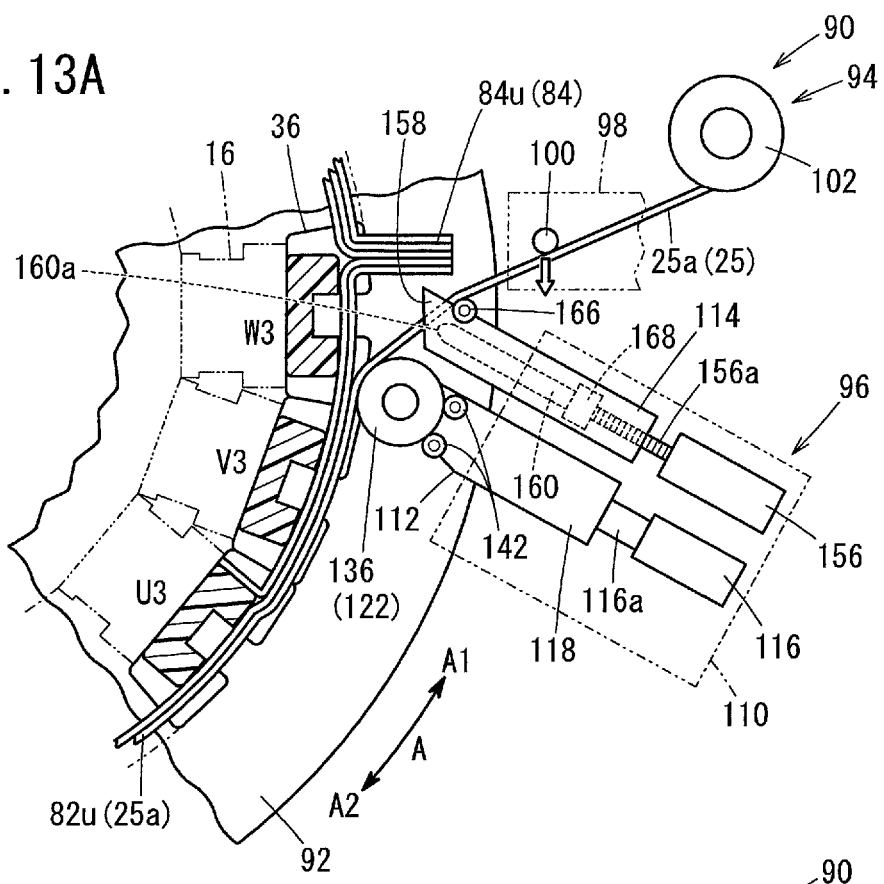
FIG. 13A is a cross-sectional plan view with partial omission showing a state in which a coil lead line of FIG. 10B is further routed within the accommodating groove.

In the case that the U1-phase first coil lead line 25a is to be routed, the U2-phase first coil lead line 25a and the U3-phase first coil lead line 25a already are routed in the A1 direction inside the accommodating grooves 62a, 62b to the position of the W3-phase divided core 16 (see FIG. 13A). Therefore, when the U1-phase first coil lead line 25a is routed in the radially outward direction (B2 direction) of the stator core 18 with respect to the U2-phase first coil lead line 25a, under the action of the first drive source 116, the insertion roller 122 is retracted slightly toward the side of the first drive source 116. Accordingly, an excessive increase in the pushing force of the insertion roller 122 with respect to the first coil lead line 25a can be suppressed.

When the first coil lead line 25a is routed in proximity to the U2 terminal part 84u (to the position of the W3-phase divided core 16), rotation of the core arranging section 92 is stopped. Further, in the case that the support mechanism 110 of the machining device 96 is undergoing movement along the A direction, the movement thereof may also be stopped. In this manner, the U1-phase first coil lead line 25a is inserted into the accommodating grooves 62a, 62b, and is routed to the position of the W3-phase divided core 16, whereby the crossover lines 82u are formed.

In the terminal part forming step and the position adjusting step, as shown in FIGS. 13B through 15B, together with the bending unit 160 being advanced under the action of the second drive source 156, in a state in which the supporting recess 184 of the position adjusting roller 180 is pressed into abutment from the A1 direction against an extending part 188 that extends from the crossover line 82u of the first coil lead line 25a, the cutting device 98 is moved to the side where the second machining unit 114 is positioned (step S7 and step S8).

Upon doing so, the curved surface 160a on the distal end of the bending unit 160 contacts a portion of the first coil lead line 25a that is positioned in the gap S between the pair of restriction walls 162, 164, the portion that is pressed by the bending unit 160 is subjected to a bending process, and together with being inserted into the accommodating groove 62a or the accommodating groove 62b, the U1-phase terminal part 84u is formed.

Figure 13B:
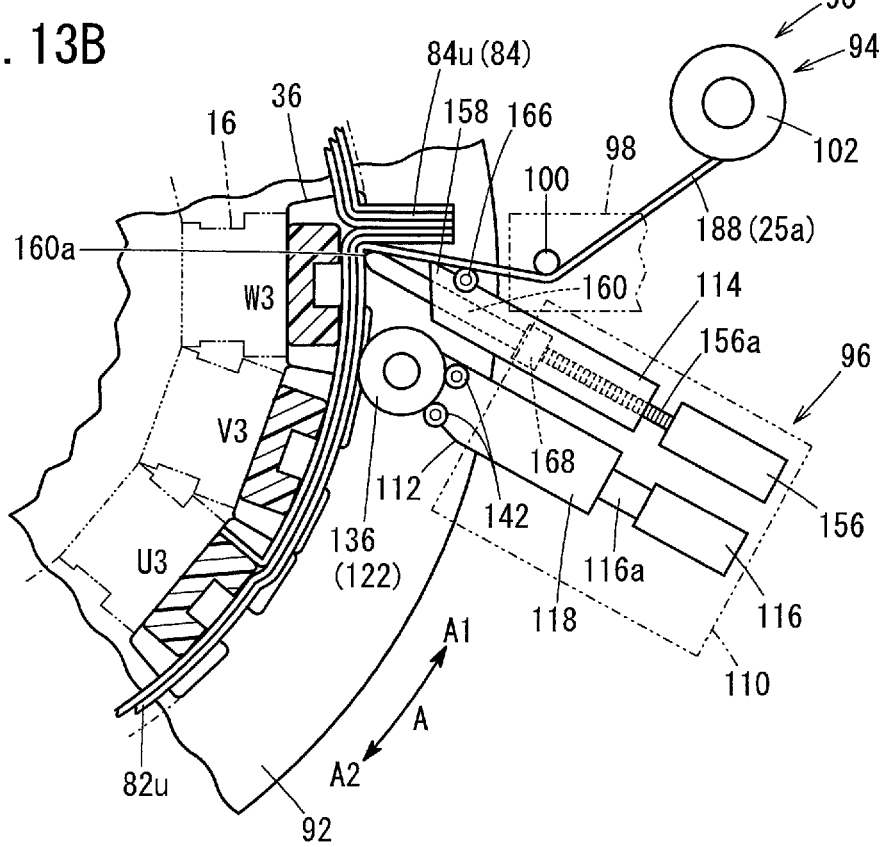
FIG. 13B is a cross-sectional plan view with partial omission for describing a terminal part forming step and a position adjusting step.

At this time, the first coil lead line 25a is bent at an acute angle with respect to the U1-phase crossover line 82u (see FIG. 13B). Further, because the extending part 188 is in contact with the supporting recess 184 of the position adjusting roller 180, the extending part 188 is prevented from separating away from the position adjusting roller 180. Furthermore, the position adjusting roller 180 rotates in contact with the extending part 188, and therefore, the occurrence of sliding friction between the surface of the extending part 188 and the outer circumferential surface of the position adjusting roller 180 can be made comparatively small.

Figure 16:
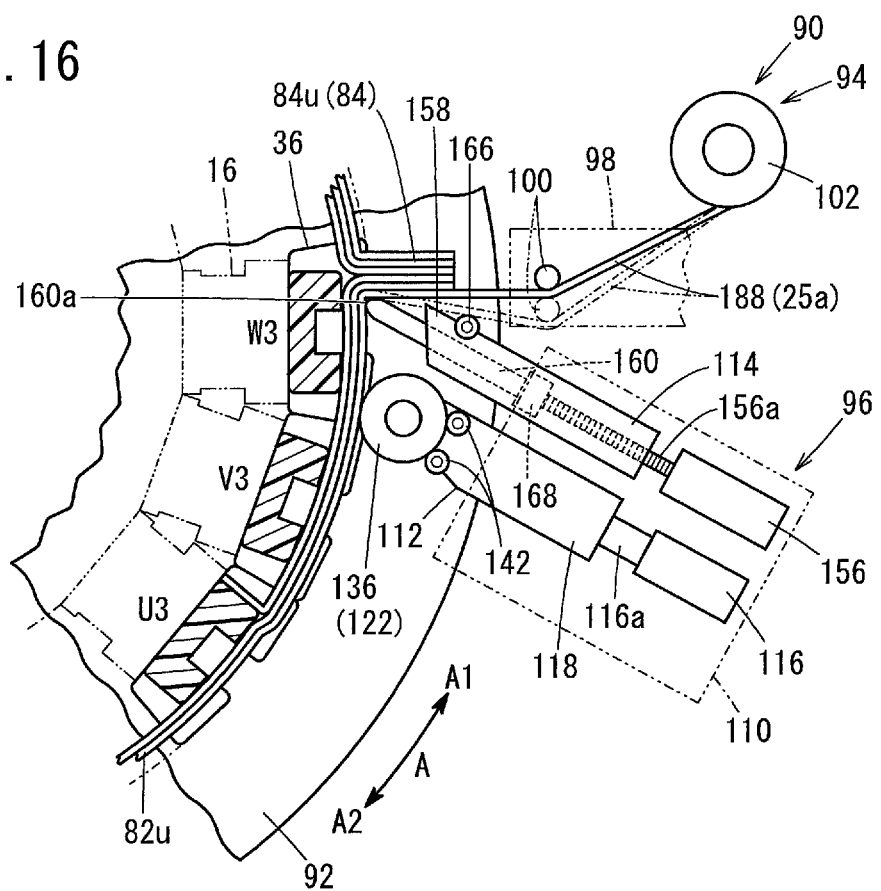
FIG. 16 is a cross-sectional plan view with partial omission for describing a position adjusting step.

Thereafter, as shown in FIG. 16, the cutting device 98 is moved to the side where the first pulley 102 is positioned, so as to separate away from the second machining unit 114. Upon doing so, the U1-phase terminal part 84u (extending part 188) springs back. Having sprung back in this manner, the U1-phase terminal part 84u is bent at substantially 90° in the B2 direction with respect to the U1-phase crossover line 82u, and comes into contact with the U2-phase terminal part 84u. Consequently, the bending angle of the U1-phase terminal part 84u with respect to the U1-phase crossover line 82u can be maintained at an appropriate angle. In other words, the U1-phase terminal part 84u can be formed with good accuracy.

Figure 17:
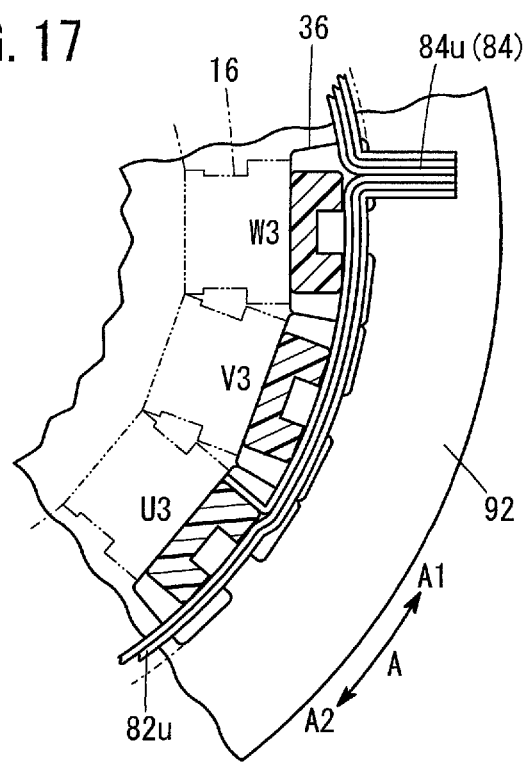
FIG. 17 is a cross-sectional plan view with partial omission showing a completed state of a cutting step.

In the cutting step, as shown in FIG. 17, a boundary portion of the extending part 188 with the terminal part 84u is cut by the cutter 172 of the cutting device 98 (step S9).

In the second machining step, concerning the U1-phase second coil lead line 25b, the crossover line forming step, the terminal part forming step, the position adjusting step, and the cutting step are carried out sequentially (step S6 through step S9). More specifically, the second machining step is performed in the same manner as the aforementioned first machining step, and therefore, detailed description of this feature is omitted. According to the present embodiment, the first machining step and the second machining step may be carried out at the same time. In this case, in the manufacturing device 90, it is necessary for two machining devices 96 to be prepared.

Since, upon completion of the second machining step, all of the operations in relation to the divided cores are completed (step S5: YES), the input terminals U, V, W are formed by connecting the crimp terminals 85u, 85v, 85w to the respective terminal parts 84u, 84v, 84w (see FIG. 1), and the manufacturing method for the current rotary electric machine 10 is brought to an end.

As noted above, although a description has been given concerning an example in which the coil lead lines 25 are routed along the A1 direction, in the case that the coil lead lines 25 are routed along the A2 direction, the positions of the first machining unit 112 and the second machining unit 114 of the machining device 96 may be interchanged. More specifically, the second machining unit 114 may be positioned in the A2 direction of the first machining unit 112.

In accordance with the present embodiment, the insertion roller 122 for forming the crossover lines 82, and the bending unit 160 for forming the terminal parts 84 are provided separately, and therefore, the terminal parts 84 can be formed reliably while damage to the outer surface of the crossover lines 82 is suppressed. Further, because the insertion roller 122 is supported rotatably with respect to the roller support section 120, when the coil lead lines 25 are inserted into the accommodating grooves 58, 60a, 60b, 62a, 62b, 64a, 64b, sliding friction that takes place between the outer circumferential surface 136a of the roller main body 136 of the insertion roller 122 and the coil lead lines 25 can be kept relatively small. Consequently, damage to the surface of the crossover lines 82 can more reliably be suppressed.

Further, since the curvature of the curved surface 160a of the bending unit 160 is greater than the curvature of the outer circumferential surface 136a of the roller main body 136, while damage to the surface of the crossover lines 82 can effectively be suppressed, the terminal parts 84 can be formed more reliably.

According to the present embodiment, the guide member 158, which is disposed in close proximity to the roller main body 136 in the direction in which the coil lead lines 25 are routed, supports the coil lead lines 25 in substantially the same position as the outer circumferential surface 136a of the roller main body 136. Therefore, at the time of the crossover line forming step, the coil lead lines 25 can be prevented from separating away from the outer circumferential surface 136a of the roller main body 136.

Further, since the bending unit 160 is disposed in the gap S between the pair of restriction walls 162, 164, due to the simple construction thereof, the coil lead lines 25 can be supported reliably substantially at the same position as the outer circumferential surface 136a of the roller main body 136.

According to the present embodiment, since the first machining unit 112 includes the wave washers 150, 154 (floating members), even in the case that the projections 66a, 66b, 68a, 68b, 70a, 70b, 72a, 72b are formed on the groove side surfaces of the accommodating grooves 58, 60a, 60b, 62a, 62b, 64a, 64b, the coil lead lines 25 can be prevented from separating away from the outer circumferential surface 136a of the roller main body 136.

Further, because the position adjusting unit 100 is provided on the cutting device 98, the manufacturing device 90 for the rotary electric machine 10 can be made compact, while the extending part 188 that is positioned by the position adjusting unit 100 is capable of being cut easily by the cutter 172.

The manufacturing device for the rotary electric machine and the manufacturing method for the rotary electric machine according to the present invention are not limited to the above embodiment, and various additional or modified structures may be adopted therein without departing from the scope of the invention as set forth in the appended claims.

What is claimed is:

1. A device for manufacturing a rotary electric machine, wherein the rotary electric machine comprises a stator including a stator core formed by arranging in an annular shape a plurality of divided cores each having a coil surrounding a portion of a divided iron core through an insulator;

wherein the stator includes:
    a crossover line which is formed by routing a coil lead line that is led out from the coil within accommodating grooves that are formed with respect to the insulator along a circumferential direction of the stator core; and
    a terminal part disposed on an end of the crossover line, the device for manufacturing the rotary electric machine comprising:
    an insertion roller, which is disposed movably relative to the divided cores along the circumferential direction of the stator core, and has an outer circumferential surface configured to contact the coil lead line so as to insert the coil lead line into the accommodating grooves;
    a roller support section configured to rotatably support the insertion roller; and
    a bending unit configured to perform a bending process to bend the coil lead line by coming into contact with the coil lead line so as to form the terminal part,
    wherein the bending unit is provided separately from the insertion roller, and
    wherein a curved surface of the bending unit having a curvature greater than a curvature of the outer circumferential surface of the insertion roller is formed on a portion of the bending unit that contacts the coil lead line.

2. The device for manufacturing the rotary electric machine according to claim 1, wherein the bending unit is configured to be advanced and retracted with respect to the coil lead line.

3. The device for manufacturing the rotary electric machine according to claim 1, wherein:
    the accommodating grooves open in a radially outward direction of the stator core; and
    the manufacturing device further comprises a guide member, which is arranged in proximity to the insertion roller in a direction in which the coil lead line is routed by the insertion roller, and the guide member supports the coil lead line at substantially a same position as the outer circumferential surface of the insertion roller in an axial direction of the stator core.

4. The device for manufacturing the rotary electric machine according to claim 1, wherein the insertion roller is adapted to be insertable into the accommodating grooves.

5. A device for manufacturing a rotary electric machine, wherein the rotary electric machine comprises a stator including a stator core formed by arranging in an annular shape a plurality of divided cores each having a coil surrounding a portion of a divided iron core through an insulator;

wherein the stator includes:
    a crossover line which is formed by routing a coil lead line that is led out from the coil within accommodating grooves that are formed with respect to the insulator along a circumferential direction of the stator core; and
    a terminal part disposed on an end of the crossover line, the device for manufacturing the rotary electric machine comprising:
    an insertion roller, which is disposed movably relative to the divided cores along the circumferential direction of the stator core, and has an outer circumferential surface configured to contact the coil lead line so as to insert the coil lead line into the accommodating grooves;
    a roller support section configured to rotatably support the insertion roller;
    a bending unit configured to perform a bending process to bend the coil lead line by coming into contact with the coil lead line so as to form the terminal part,
    a guide member, which is arranged in proximity to the insertion roller in a direction in which the coil lead line is routed by the insertion roller, and the guide member supports the coil lead line at substantially a same position as the outer circumferential surface of the insertion roller in an axial direction of the stator core,
    wherein the accommodating grooves open in a radially outward direction of the stator core,
    the guide member includes a pair of restriction walls that face one another mutually along the axial direction of the stator core,
    a gap in which the coil lead line is capable of being inserted is formed between the pair of restriction walls, and
    the bending unit is disposed in the gap while being capable of being advanced and retracted with respect to a portion of the coil lead line that is positioned in the gap.

6. The device for manufacturing the rotary electric machine according to claim 5, wherein a guide roller configured to guide the coil lead line into the gap is provided on the guide member.

* * * * *